US009710715B2

(12) United States Patent
Kikuchi et al.

(10) Patent No.: US 9,710,715 B2
(45) Date of Patent: Jul. 18, 2017

(54) IMAGE PROCESSING SYSTEM, IMAGE PROCESSING DEVICE, AND IMAGE PROCESSING METHOD

(71) Applicants: Taro Kikuchi, Tokyo (JP); Takashi Uozumi, Kanagawa (JP)

(72) Inventors: Taro Kikuchi, Tokyo (JP); Takashi Uozumi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 28 days.

(21) Appl. No.: 14/968,955

(22) Filed: Dec. 15, 2015

(65) Prior Publication Data
US 2016/0189354 A1 Jun. 30, 2016

(30) Foreign Application Priority Data

Dec. 26, 2014 (JP) .................................. 2014-265512
Jul. 24, 2015 (JP) .................................. 2015-146691

(51) Int. Cl.
*G06K 9/00* (2006.01)
*G06T 5/40* (2006.01)
(Continued)

(52) U.S. Cl.
CPC .......... *G06K 9/00798* (2013.01); *G06T 5/008* (2013.01); *G06T 5/40* (2013.01); *G06T 7/136* (2017.01); *H04N 5/2351* (2013.01); *H04N 5/23229* (2013.01); *G06T 2207/10024* (2013.01); *G06T 2207/20012* (2013.01);
(Continued)

(58) Field of Classification Search
None
See application file for complete search history.

(56) References Cited

U.S. PATENT DOCUMENTS 8,582,915 B2 * 11/2013 Wen ........................ H04N 19/51
382/261
8,823,730 B2 * 9/2014 Mihara ................. G06T 11/001
345/581
(Continued)

FOREIGN PATENT DOCUMENTS

JP 7-028975 1/1995
JP 2002-140700 5/2002
(Continued)

*Primary Examiner* — Feng Niu
(74) *Attorney, Agent, or Firm* — Harness, Dickey & Pierce, P.L.C.

(57) ABSTRACT

An image processing system, an image processing device, and image processing method are provided. Each of the image processing system, the image processing device, and the image processing method includes dividing an image into a plurality of areas according to a predetermined division condition, measuring an optical transmittance of each of the plurality of divided areas or data correlating with the optical transmittance as transmittance data, calculating the optical transmittance or the data correlating with the optical transmittance from the image as the transmittance data, determining a parameter for adjusting a contrast for each of the plurality of areas according to the transmittance data obtained by the measuring or the calculating, and adjusting a contrast of each one of the plurality of areas using the parameter determined by the determining.

15 Claims, 25 Drawing Sheets

(51) Int. Cl.
*H04N 5/232* (2006.01)
*H04N 5/235* (2006.01)
*G06T 5/00* (2006.01)
*G06T 7/136* (2017.01)

(52) U.S. Cl.
CPC ............... *G06T 2207/20021* (2013.01); *G06T 2207/20208* (2013.01); *G06T 2207/30232* (2013.01); *G06T 2207/30256* (2013.01)

(56) References Cited

U.S. PATENT DOCUMENTS

| | | | | |
|---|---|---|---|---|
| 8,885,962 | B1 * | 11/2014 | Mudge | G01J 4/04 382/254 |
| 9,438,793 | B2 * | 9/2016 | Adachi | H04N 5/23229 |
| 2012/0212477 | A1 * | 8/2012 | Grindstaff | G06T 5/003 345/419 |
| 2012/0213436 | A1 * | 8/2012 | Grindstaff | G06T 5/008 382/167 |
| 2012/0328205 | A1 * | 12/2012 | Wen | H04N 19/51 382/233 |
| 2014/0253606 | A1 * | 9/2014 | Yun | G02B 5/0278 345/690 |
| 2014/0314332 | A1 * | 10/2014 | Mudge | G01J 4/04 382/255 |
| 2015/0146980 | A1 * | 5/2015 | Itoh | G06K 9/4652 382/167 |
| 2015/0163405 | A1 * | 6/2015 | Adachi | H04N 5/23232 348/294 |

FOREIGN PATENT DOCUMENTS

| | | |
|---|---|---|
| JP | 2006-195651 | 7/2006 |
| JP | 2012-221237 | 11/2012 |
| JP | 2013-015751 | 1/2013 |

* cited by examiner

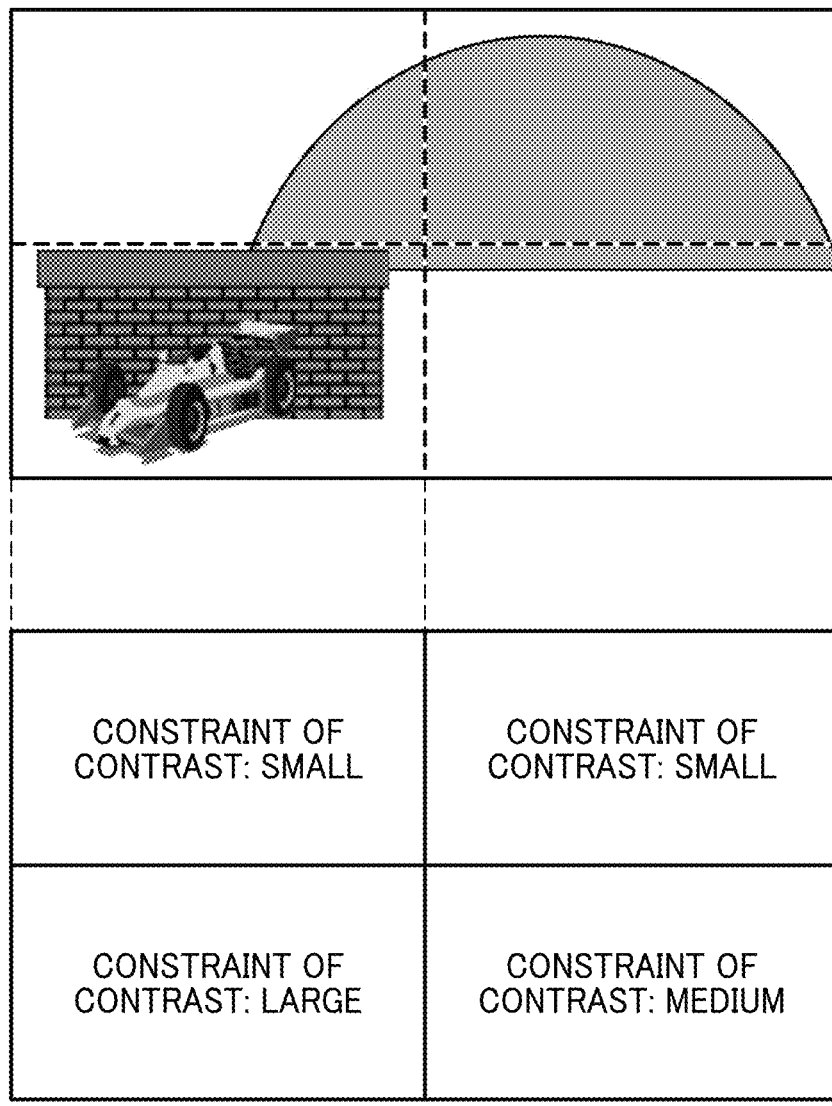

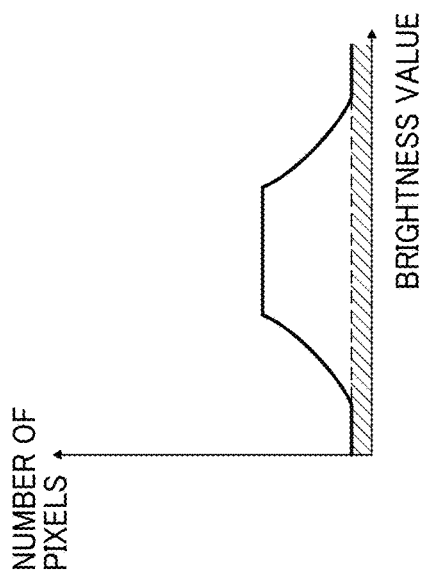
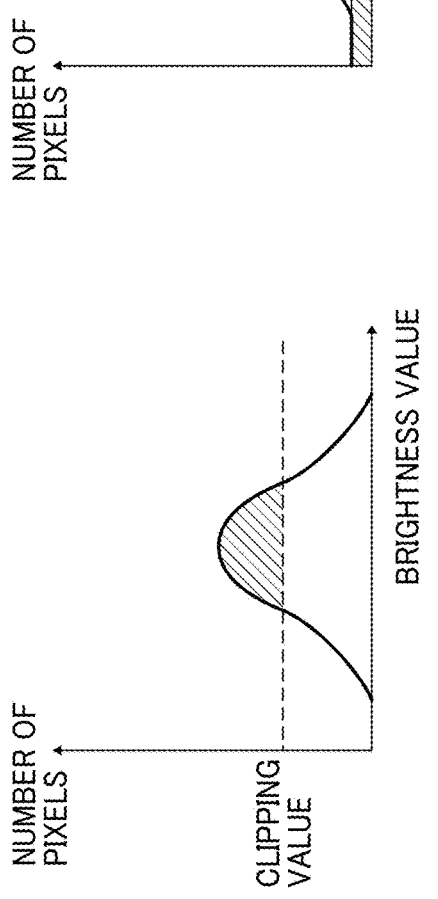
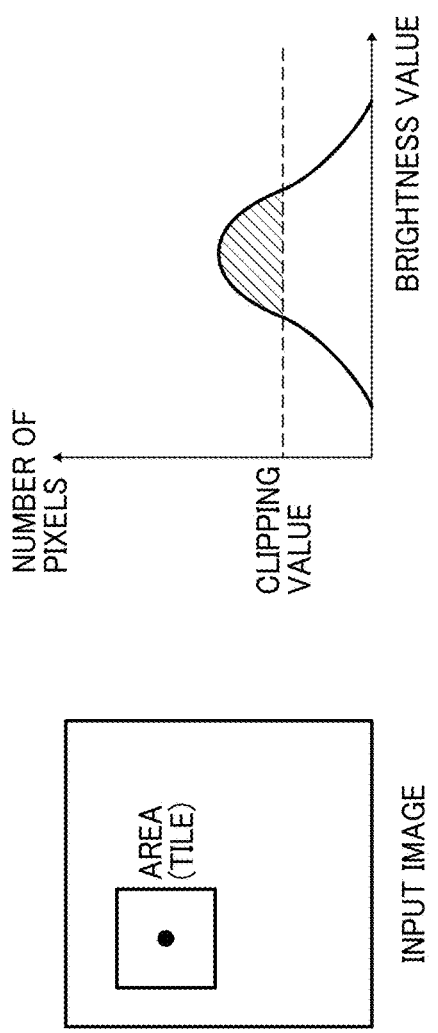

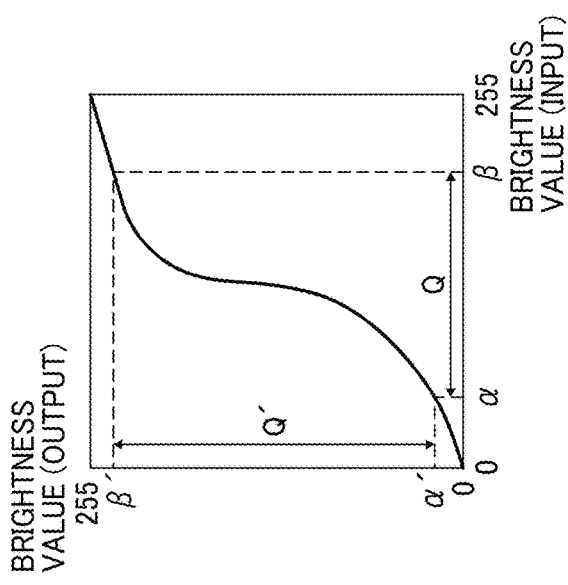
FIG. 5C
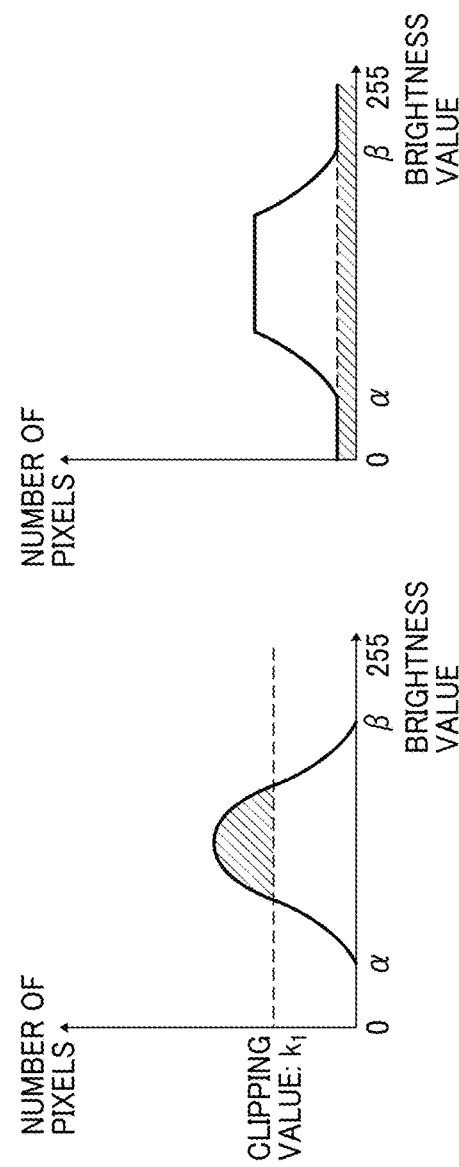
FIG. 5B
FIG. 5A

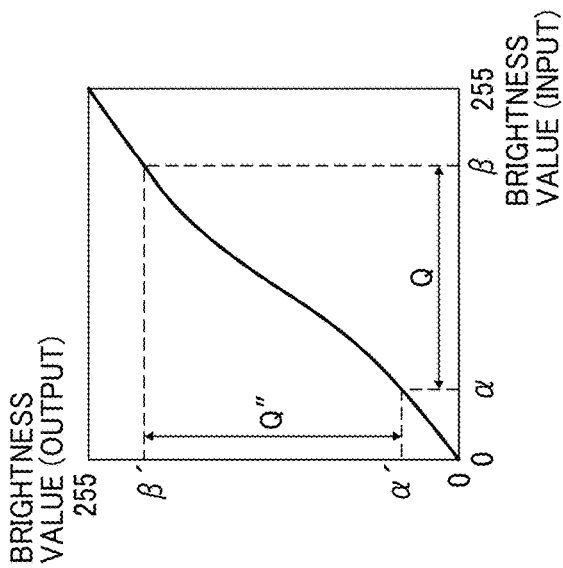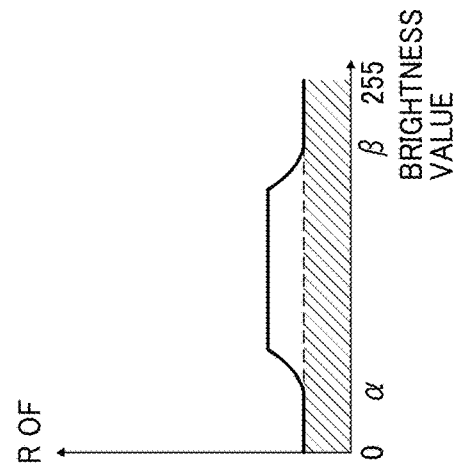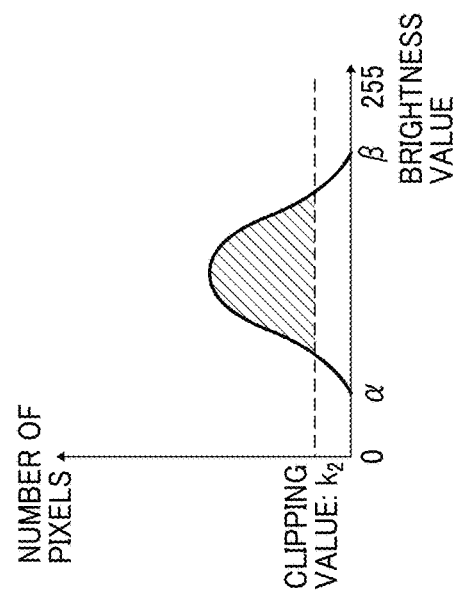

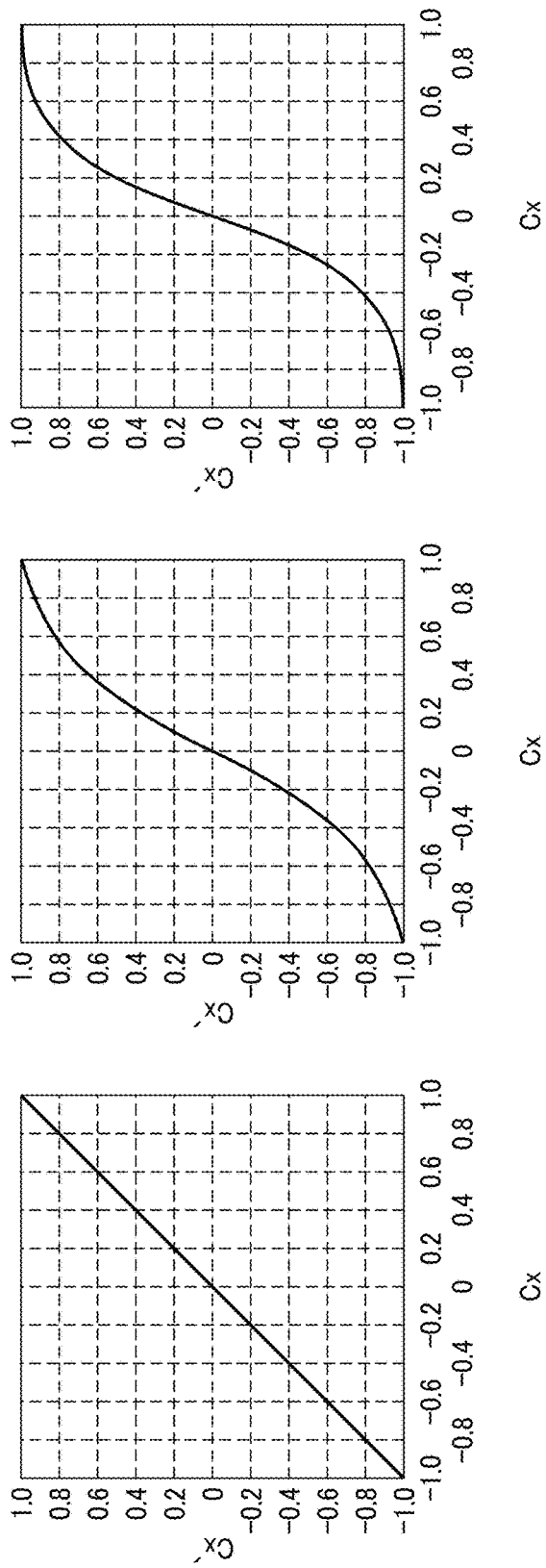

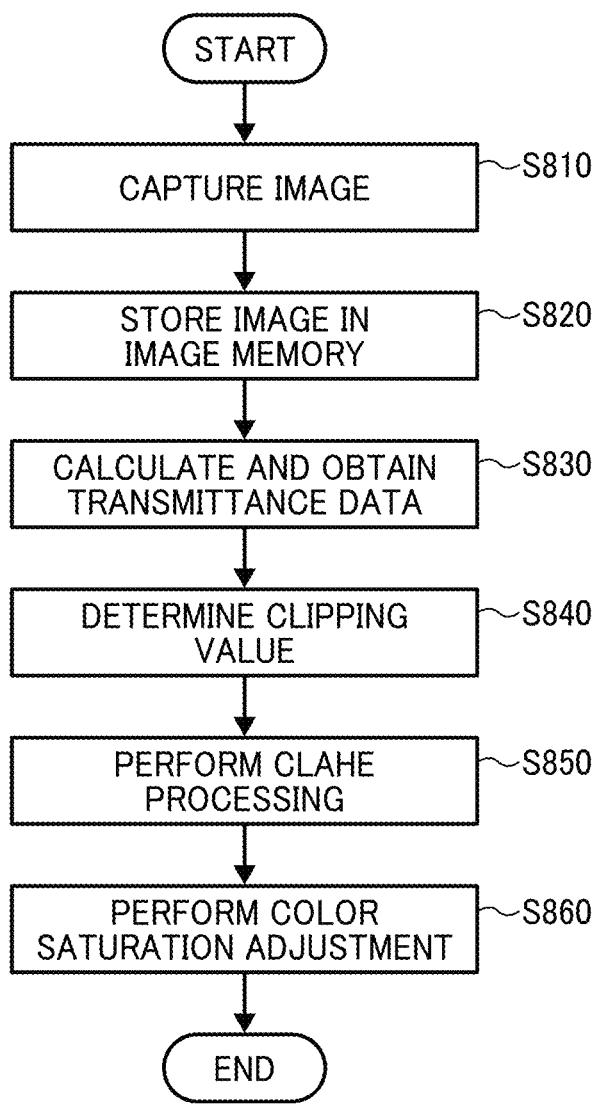

WIDE RIM

TELE-RIM

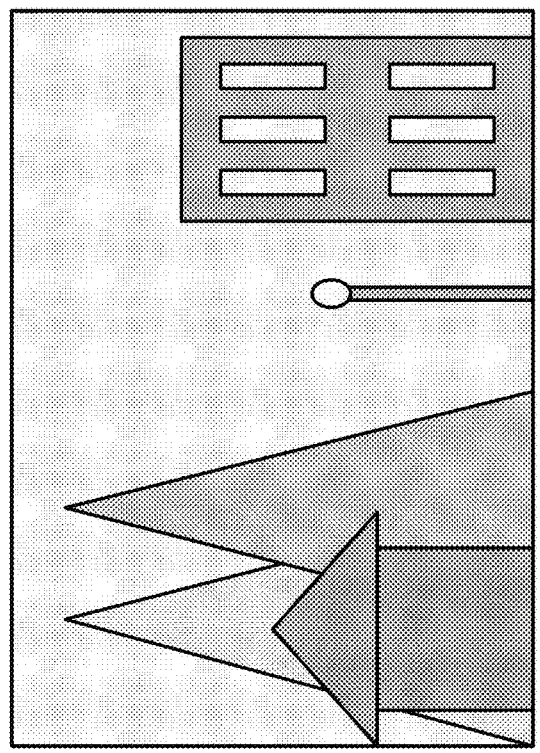
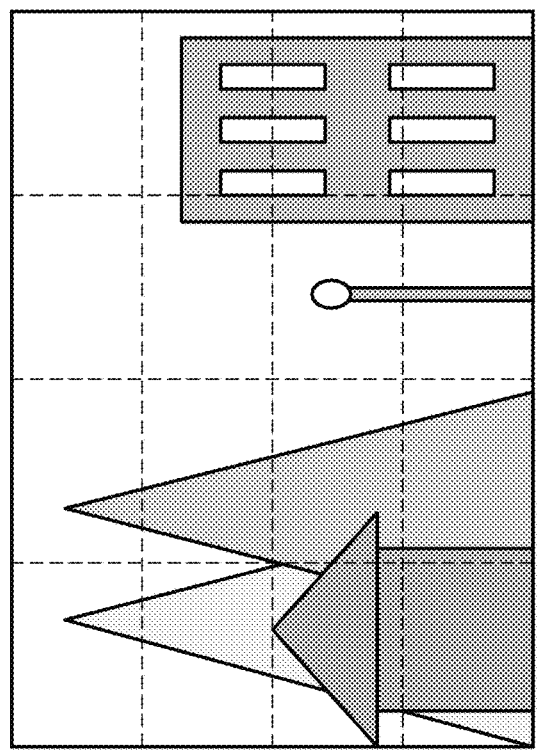
FIG. 16B
FIG. 16A

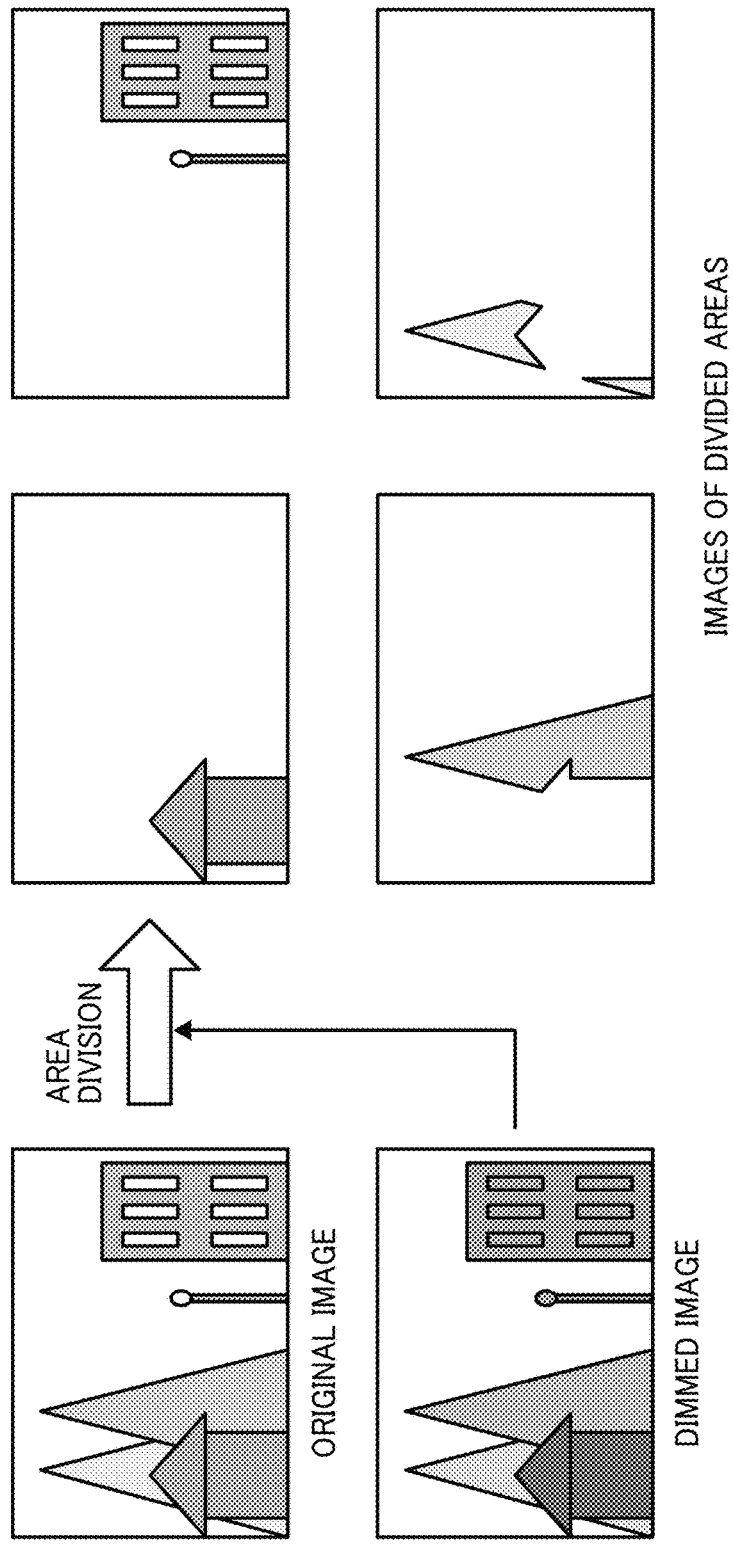

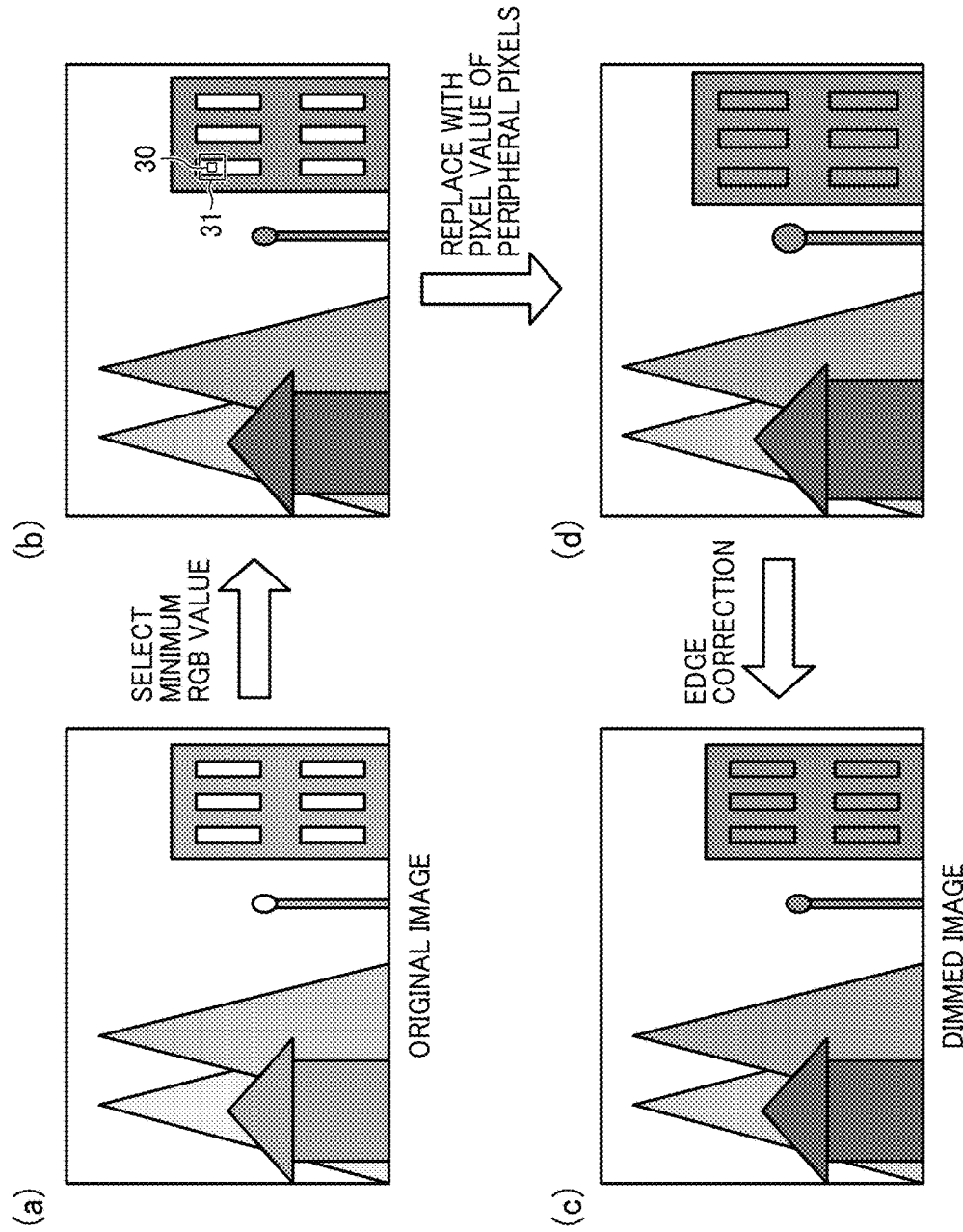

IMAGE PROCESSING SYSTEM, IMAGE PROCESSING DEVICE, AND IMAGE PROCESSING METHOD

CROSS-REFERENCE TO RELATED APPLICATIONS

This patent application is based on and claims priority pursuant to 35 U.S.C. §119(a) to Japanese Patent Application Nos. 2014-265512 and 2015-146691, filed on Dec. 26, 2014, and Jul. 24, 2015, respectively, in the Japan Patent Office, the entire disclosure of which is hereby incorporated by reference herein.

BACKGROUND

Technical Field

Embodiments of the present invention relate to an image processing system, an image processing device, and an image processing method.

Background Art

When an object outside or a remote object is captured or observed, for example, by a vehicle-installed camera, a surveillance camera, and electronic binoculars, the transmittance may deteriorate due to the light that is dispersed, for example, by fog, mist, bai, and a particulate matter (PM) 2.5. As a result, the image of the object has a low contrast (the degree of difference between the darker and lighter parts), and the viewability deteriorates.

Conventionally, the technology to divide an image into segments according to the texture and flatten the histogram of the divided areas for the purpose of improving the contrast is known. This technology is referred to as the contrast limited adaptive histogram Equalization (CLAHE). When a histogram is flattened using the CLAHE, a constraint value is imposed on the contrast improvement.

SUMMARY

Embodiments of the present invention described herein provide an image processing system, an image processing device, and image processing method. Each of the image processing system, the image processing device, and the image processing method includes dividing an image into a plurality of areas according to a predetermined division condition, measuring an optical transmittance of each of the plurality of divided areas or data correlating with the optical transmittance as transmittance data; calculating the optical transmittance or the data correlating with the optical transmittance from the image as the transmittance data, determining a parameter for adjusting a contrast for each of the plurality of areas according to the transmittance data obtained by the measuring or the calculating, and adjusting a contrast of each one of the plurality of areas using the parameter determined by the determining.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 3 is a schematic diagram illustrating the contrast adjustment of an image, according to an embodiment of the present invention.

FIG. 4A, FIG. 4B, and FIG. 4C are diagrams illustrating the clipping computation performed in the contrast adjustment of an image, according to an embodiment of the present invention.

FIGS. 5A to 5F are diagrams illustrating an effect achieved by setting a clipping value, according to an embodiment of the present invention.

FIG. 7A, FIG. 7B, and FIG. 7C are diagrams illustrating the gain used in color saturation adjustment according to an embodiment of the present invention.

FIG. 8 is a flowchart of a flow of the contrast adjustment performed by an imaging device provided with the image processing device illustrated in FIG. 2.

FIG. 16A and FIG. 16B are diagrams illustrating an example of area division according to an embodiment of the present invention.

FIG. 17 is a diagram illustrating an example of an area dividing method according to an embodiment of the present invention.

FIG. 18 is a diagram illustrating a method of generating a dimmed image, according to an embodiment of the present invention.

Figure 1:
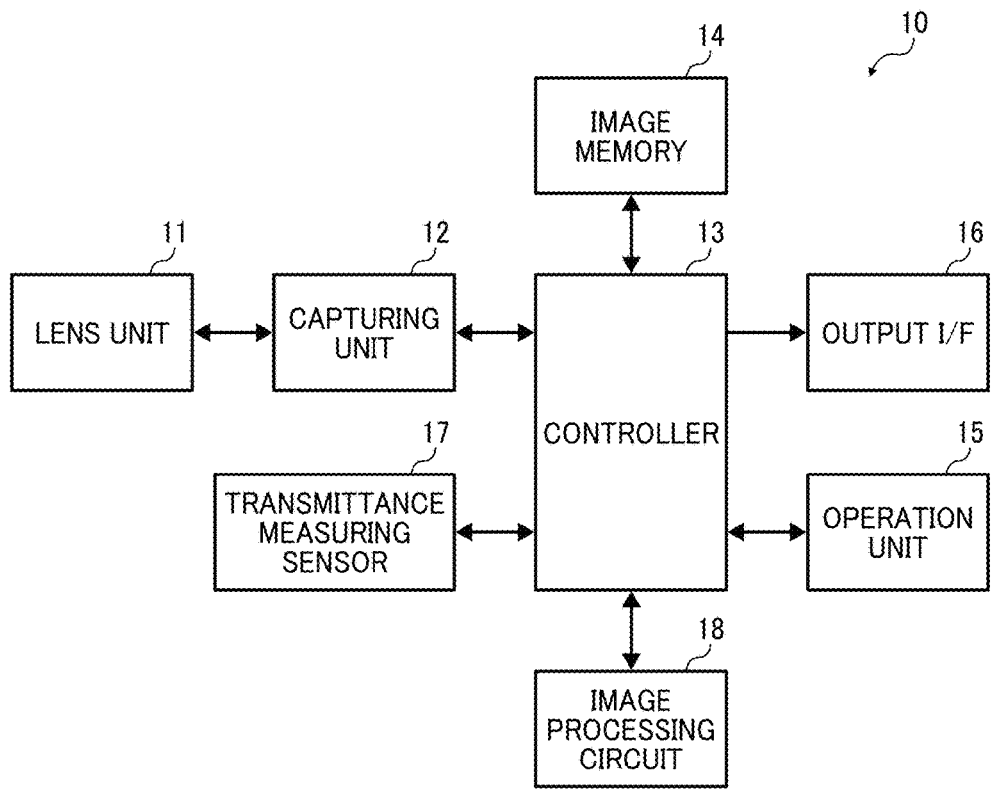
FIG. 1 is a schematic diagram illustrating an example of the structure of an imaging device according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 illustrates an example of the configuration of an imaging device according to an embodiment of the present invention. The imaging device may be any of a digital camera, a camcorder, a pair of digital binoculars, a laptop personal computer (PC), a tablet PC, a smartphone, a mobile phone, a personal digital assistant (PDA), or the like. Note that the camcorder includes, for example, a vehicle-installed camera and a surveillance camera. An imaging device 10 includes a lens unit 11, a capturing unit 12, a controller 13, an image memory 14, an operation unit 15, an output interface (I/F) 16, a transmittance measuring sensor 17, and an image processing circuit 18.

The imaging device 10 is arranged such that the lens unit 11 faces an object to be captured, and a shutter button that is a part of the operation unit 15 is depressed when the object is captured. When the shutter button is depressed, the imaging device 10 lets the light reflected at the object enter the capturing unit 12 through the lens unit 11. The lens unit 11 includes a plurality of lenses, a lens stop, and a focus adjustment mechanism. The focus adjustment mechanism provides an autofocus (AF) function by which the focus is automatically adjusted.

The capturing unit 12 includes an imaging element such as a complementary metal oxide semiconductor (CMOS) image sensor and a charge-coupled device (CCD) image sensor. The imaging element converts the light that has entered the imaging element into a voltage according to the intensity of the light. The capturing unit 12 includes an analog front end (AFE) circuit that increases the gain of the voltage that is converted by the imaging element. Moreover, the capturing unit 12 includes an analog-to-digital (A/D) converter that converts the voltage output from the AFE circuit, i.e., an analog signal, into digital data. The digital data that is output from the A/D converter is output to the controller 13.

The controller 13 controls the imaging device 10 in its entirety. The controller 13 receives the image data of the captured image, which is digital data, from the capturing unit 12. Then, the controller 13 sends the received image data to the image processing circuit 18 such that the image processing circuit 18 performs image processing on the sent image data. Moreover, the controller 13 stores the received image data in the image memory 14, or outputs the received image data to an output device through the output I/F 16. Further, the controller 13 controls the lens unit 11 according to the AF function provided for the lens unit 11, and controls the lens unit 11 according to an instruction received by the operation unit 15 for, for example, changing the focal length of the lens, to switch the function or focal length of the lens unit 11.

The controller 13 includes a memory in which a program for performing the control as described above or setting data such as set values used by the program are stored, and a CPU that executes the program. The memory can store the lens data of the lens such as the focal length of the lens in order to realize the AF function and change the focal length as described above.

The operation unit 15 includes an operation panel or various kinds of buttons such as a shutter button. The operation unit 15 obtains the detail of the operation made to the imaging device 10, and transfers the obtained detail of the operation to the controller 13. For example, when the shutter button is depressed, the operation unit 15 notifies the controller 13 that the shutter button has been depressed. In this case, the controller 13 instructs the capturing unit 12 to capture an object. In addition to the detail of the operation, the operation unit 15 also receives data indicating whether or not to adjust the fog, and transfers the received data to the controller 13. Note that the adjustment of the fog is one of the contrast adjustment.

The output I/F 16 receives the image data stored in the image memory 14 through the controller 13, and outputs the received image data to the output device. The output device may be any device that outputs image data, including, for example, a printer, a facsimile, a photocopier, an electronic whiteboard, a projector, a PC, a tablet PC, and a smartphone. The output I/F 16 may be connected to the output device through a wired connection such as a high-definition multimedia interface (HDMI) cable (registered trademark), or through the network. Note that the network may be any known network such as the local area network (LAN), the wide area network (WAN), and the Internet, and the network may be through a wired connection or through a wireless connection.

The transmittance measuring sensor 17 is sensor that measures the optical transmittance, and may be used as a measuring unit. As the transmittance may be measured on an image, the transmittance measuring sensor 17 is not necessarily installed in the imaging device 10. The transmittance measuring sensor 17 can measure the transmittance, for example, by projecting infrared light or the like to measure its back scattering. A distance-measuring sensor may be used as the transmittance measuring sensor 17 to measure the distance between the imaging device 10 and an object. In such as case, the transmittance is measured from the measured distance together with the image data. Alternatively, a laser beam having a specific wavelength may be emitted to calculate the transmittance from the reflectance of the emitted laser beam. A plurality of imaging devices may be used to capture multiple images with varying angles to calculate the distance between the imaging device 10 and the object from parallaxes of the captured images. In this case, the transmittance is calculated from the calculated distance. The transmittance measuring sensor 17 is also controlled by the controller 13. By using the transmittance measuring sensor 17 to measure the transmittance, transmittance can be obtained with higher accuracy than cases in which the transmittance is obtained from an image.

The image processing circuit 18 receives the image data, which is output from the capturing unit 12 and is stored in the image memory 14, through the controller 13, and performs image processing on the received image data to meet an output form that the output device demands. The image processing circuit 18 also adjusts the contrast. The image processing circuit 18 may be configured as a device separate from the controller 13 as illustrated in FIG. 1. Alternatively, the image processing circuit 18 may be configured as a program, and the controller 13 or the like circuit or device may execute the program. A configuration in which the controller 13 or the like executes the program to perform the above-described image processing may be provided as an image processing system instead of an image processing device.

Figure 2:
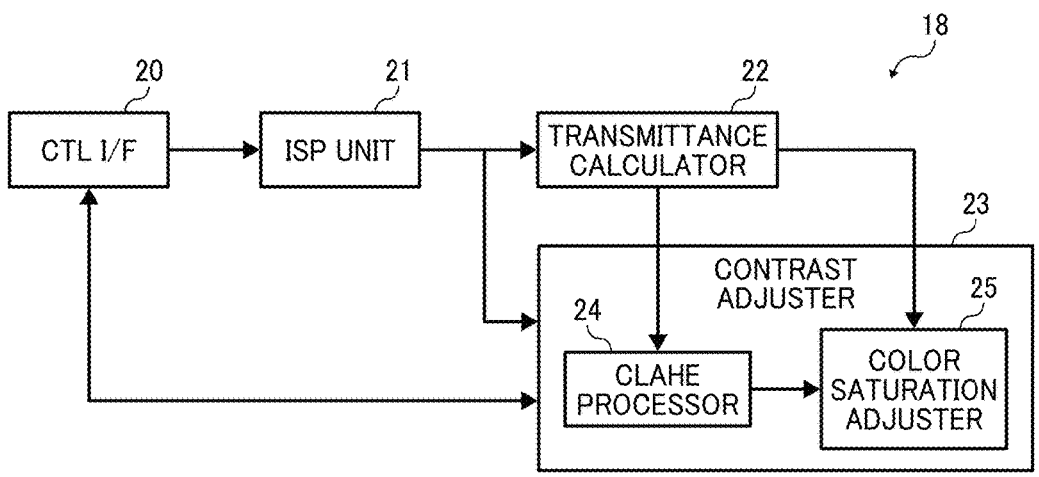
FIG. 2 is a functional block diagram illustrating an example of an image processing device according to an embodiment of the present invention.

FIG. 2 is a functional block diagram of the image processing circuit 18 that serves as an image processing device, according to the present embodiment. FIG. 2 illustrates an example configuration in which the transmittance measuring sensor 17 illustrated in FIG. 1 is not used. The image processing circuit 18 includes a controller (CTL) I/F 20, an image signal processing (ISP) unit 21, a transmittance calculator 22 that serves as a measuring unit, and a contrast adjuster 23. Note that when the transmittance measuring sensor 17 is used, the transmittance calculator 22 is not necessary. When the transmittance measuring sensor 17 is used in place of the transmittance calculator 22, the transmittance measuring sensor 17 measures the transmittance and obtains the transmittance data, and the transmittance measuring sensor 17 provides the contrast adjuster 23 with the obtained transmittance data.

The image data that is captured and output by the capturing unit 12 illustrated in FIG. 1 is stored in the image memory 14 via the controller 13. The image data that is stored in the image memory 14 is transferred to the image processing circuit 18 through the controller 13. The CTL I/F 20 is connected to the controller 13, and receives the image data stored in the image memory 14 through the controller 13. Moreover, the CTL I/F 20 passes the image data on which image processing has been performed to the controller 13.

The ISP unit 21 performs the image processing of cameras known in the art. Such image processing includes, for example, black-level correction, shading correction, gain control, gamma correction, RGB (red, green, blue) conversion, filtering, and color correction. The ISP unit 21 outputs the image data on which image processing has been performed to the transmittance calculator 22 and the contrast adjuster 23.

The transmittance calculator 22 performs image processing on the image data received from the ISP unit 21, and calculates and obtains the transmittance. The method of calculation of the transmittance will be described later in detail. The transmittance calculator 22 outputs the calculated transmittance as transmittance data to the contrast adjuster 23.

The contrast adjuster 23 uses the transmittance data received from the transmittance calculator 22 to perform image processing. More specifically, the contrast adjuster 23 performs the CLAHE for the brightness components, and performs the color saturation adjustment for the color-tone components. For this reason, the contrast adjuster 23 includes a CLAHE processor 24 that performs the CLAHE, and a color saturation adjuster 25 that performs color saturation adjustment. After the image processing is complete, the contrast adjuster 23 stores the image data on which the image processing has been performed in the image memory 14 via the CTL I/F 20. The output device requests the image data from the controller 13 through the output I/F 16, and the controller 13 outputs the image data stored in the image memory 14 to the output device through the output I/F 16.

The contrast adjuster 23 does not only receive the image data on which the ISP unit 21 has performed image processing, but also receives the image data directly from the CTL I/F 20. Moreover, the contrast adjuster 23 can adjust the contrast of the image data that is directly received from the CTL I/F 20. The contrast adjuster 23 may perform any one of the CLAHE and color saturation adjustment instead of performing both the CLAHE and the color saturation adjustment.

Here, the CLAHE that the CLAHE processor 24 performs is briefly described. In the CLAHE, as illustrated in FIG. 3, a captured image is divided into a plurality of rectangular regions (tiles), and the histogram is flattened for each of the tiles. By so doing, the contrast is enhanced. FIG. 3 illustrates an image captured in a foggy place. It is to be noted that the density of the fog is even in that place, and the optical transmittance changes according to the distance to the imaging device 10. In the following description, cases of fog will be described. However, no limitation is intended thereby, and the fog may be changed, for example, to a haze, bai, and particulate matter (PM) 2.5.

Among the tiles that are equally divided into four in both vertical and horizontal directions as illustrated in FIG. 3, the optical transmittance is low in the two upper tiles as a mountain at long distance is captured therein, and the optical transmittance is high in the bottom-left tile as a car at short distance is captured therein. Moreover, the optical transmittance has a middle value in the bottom-right tile as an object at middle distance is captured therein.

In a fog image that is captured in the fog, a tile with low optical transmittance, i.e., a tile where the distance to an object to be captured is long and the fog is thickly captured, has low contrast, and thus the object to be captured is not clear. For this reason, the constraint value of the contrast is made small, and the contrast is well enhanced. On the other hand, a tile with high optical transmittance, i.e., a tile where the distance to an object to be captured is close and the fog is thinly captured, is assigned with a large constraint value of contrast such that the contrast is not very much enhanced. A tile with intermediate optical transmittance is assigned with an intermediate constraint value such that the contrast is moderately enhanced. Accordingly, an image where the object to be captured is not clear is adjusted in such a manner that the object to be captured becomes clearly visible, and an image where the object to be captured is clear is controlled in such a manner that the object to be captured is not excessively adjusted. By so doing, the noise can be minimized.

When the thickness of the fog is even, as described above, the constraint value of the contrast is changed according to the distance to the object to be captured, and the contrast is thereby enhanced. When the thickness of the fog is not even, the optical transmittance does not depend on the distance. Accordingly, the constraint value of the contrast is changed according to the measured transmittance or the calculated transmittance, and the contrast is thereby enhanced.

The number of the tiles into which an image is divided by the CLAHE is not limited to four as illustrated in FIG. 3, and may be divided into a larger number of tiles. For example, an image may be divided into nine, sixteen, and twenty-five tiles. The flattening of a histogram using the CLAHE may be implemented by adopting any known method. For example, the method disclosed in JP-2006-195651-A may be adopted. As the contrast adjuster 23 adjusts an image into multiple tiles as described above, the contrast adjuster 23 does not only serve as an adjuster that adjusts the contrast, but also serves as a divider that divides an image into a plurality of areas.

The flattening of a histogram strongly enhances the contrast. For this reason, a parameter called clipping value is introduced as a constraint value of the contrast in order to weaken the contrast enhancement, and a clipping computation of the histogram is performed.

The clipping computation is a computation used in the local histogram equalization. The local histogram equalization is a contrast enhancement technique known in the art, and contrast enhancement is performed in view of the local data of the image in the contrast enhancement. The clipping computation is described with reference to FIG. 4A, FIG. 4B, and FIG. 4C. FIG. 4A indicates an area (tile) in an input image, and FIG. 4B is a distribution map of the distribution of the brightness values of the pixels included in the tile illustrated in FIG. 4A.

The tile is given a prescribed clipping value, and when the number of pixels exceeds the clipping value at some of the brightness values, the exceeding number of pixels as indicated in FIG. 4B by the oblique lines are removed. The sum of the number of the exceeding pixels is calculated, and the obtained sum is divided by the total number of the brightness values. Accordingly, the number of the pixels to be distributed to each of the brightness values is calculated. Then, the number of the pixels to be distributed to each of the brightness values is added to the number of the pixels at each of the brightness values from which the number of the pixels exceeding the clipping value has been removed. Accordingly, as illustrated in FIG. 4C, new numbers of pixels at each of the brightness values are calculated. For example, when the sum of the number of pixels indicated by the oblique lines illustrated in FIG. 4B is 512 and the total number of the brightness values is 256 due to 256-level gray scale, two pixels are distributed and added to each of all the brightness values due to the calculation "512/256=2". In the clipping computation, the distribution of the numbers of pixels at the brightness values as calculated above is redefined.

FIGS. 5A to 5F are diagrams illustrating an effect achieved by setting a clipping value, according to the present embodiment. In the distribution maps where the number of pixels exceeding a clipping value has not yet been removed as illustrated in FIG. 5A and FIG. 5D on the left side, the brightness values of a certain divided tile distribute between $\alpha$ and $\beta$. In FIG. 5A, FIG. 5B, and FIG. 5C, the number of pixels exceeding a clipping value $k_1$ is removed. In a similar manner, in FIG. 5D, FIG. 5E, and FIG. 5F, the number of pixels exceeding a clipping value $k_2$ ($k_2<k_1$) is removed. The sum of the number of the exceeding pixels is calculated, and the obtained sum is divided by the total number of the brightness values. Accordingly, the number of the pixels to be distributed to each of the brightness values is calculated. The obtained number of pixels is added to each of all the brightness values. As a result, the post-clipping distribution maps as illustrated in FIG. 5B and FIG. 5E in the center are obtained. The post-clipping distribution maps are referred to, and the numbers of pixels at the brightness values between 0 to 255 are added and accumulated, and are normalized. As a result, the conversion curves that indicate the converted brightness values at the brightness values are obtained as illustrated in FIG. 5C and FIG. 5F the right side. In the present embodiment, the normalization is done in order to bring the values into the range of 0 to 255.

Such a conversion curve may be calculated by adding up the numbers of pixels at the brightness values on all such occasions. Alternatively, a look-up table (LUT) that is obtained by adding up the numbers of pixels at the brightness values is stored in a memory or the like in advance, and a conversion curve may be selected from such a LUT.

Figure 6A:
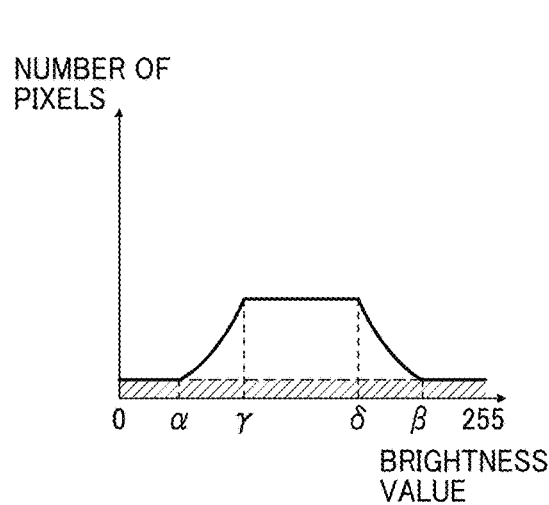
FIG. 6A and FIG. 6B are diagrams illustrating a method of calculating a contrast adjustment curve, according to the present embodiment.
Figure 6B:
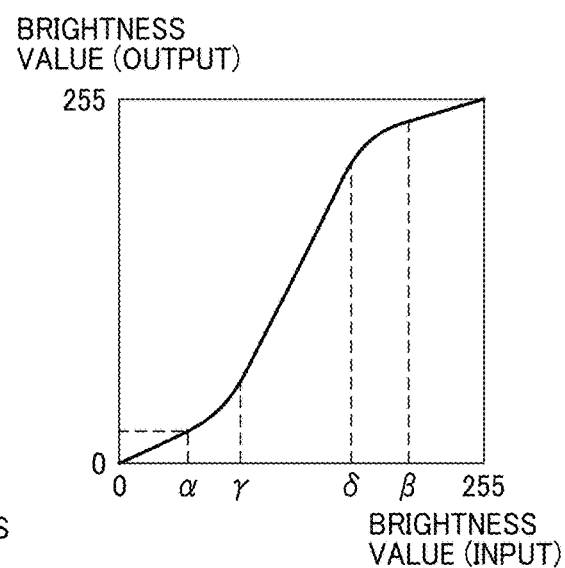

FIG. 6A and FIG. 6B are diagrams illustrating a method of calculating a contrast adjustment curve, according to the present embodiment. More specifically, a method of calculating a conversion curve from a post-clipping distribution map will be described in detail with reference to FIG. 6A and FIG. 6B. FIG. 6A illustrates a post-clipping distribution map, and FIG. 6B illustrates a conversion curve obtained from the distribution map illustrated in FIG. 6A. As illustrated in FIG. 6A, the number of pixels is constant in the range where the brightness value is 0 to $\alpha$. In the range where the brightness value is 0 to $\alpha$, a post-conversion brightness value is obtained by adding and accumulating a fixed number of pixels to a pre-conversion brightness value. Accordingly, as illustrated in FIG. 6B, the conversion curve in the range where the brightness value is 0 to $\alpha$ has a fixed degree of inclination. In a similar manner, in the range where the brightness value is $\gamma$ to $\delta$ and the range where the brightness value is $\beta$ to 255, a post-conversion brightness value is obtained by adding and accumulating a fixed number of pixels to a pre-conversion brightness value. Accordingly, as illustrated in FIG. 6B, the conversion curve in the range where the brightness value is γ to δ and the range where the brightness value is β to 255 has a fixed degree of inclination.

Note that the number of pixels to be added is greater in the range where the brightness value is γ to δ than in the range where the brightness value is 0 to α and the range where the brightness value is β to 255. Accordingly, the inclination in the range where the brightness value is γ to δ is steeper than the inclination in the range where the brightness value is 0 to α and the range where the brightness value is β to 255. In the range where the brightness value is α to γ, as illustrated in FIG. 6A, the number of pixels is not constant, and there is a tendency of sharp increase. Accordingly, the conversion curve in the range where the brightness value is α to γ, which is obtained by adding and accumulating a number of pixels, becomes, as illustrated in FIG. 6B, a sharply increasing curve instead of a straight line. By contrast, in the range where the brightness value is δ to β, there is a tendency of sharp decrease in the number of pixels. Accordingly, the conversion curve in the range where the brightness value is δ to β becomes a sharply decreasing curve. The conversion curve that is illustrated in FIG. 6B can be obtained by joining these straight lines and curves together.

As described above, conversion curves can be obtained from the post-clipping distribution maps FIG. 5A, FIG. 5B, FIG. 5D, and FIG. 5E. In the example FIG. 5A, FIG. 5B, and FIG. 5C where the set clipping value is large, α>α' and β<β', and Q<Q' in the relation of the distance Q between α to β and the distance Q' between α' to β', in the conversion curve. This indicates that the distribution of the pixels is expanded as α indicating the lower limit of the brightness value is decreased to α' and the β indicating the upper limit of the brightness value is increased to β'. In other words, the levels of gradation are expanded after the conversion compared with the levels of gradation of the original image. Accordingly, portions with similar levels of brightness value, which were hard to discriminate, can clearly be discriminated.

In the example FIG. 5D, FIG. 5E, and FIG. 5F where the set clipping value is small, in a similar manner to the example illustrated in FIG. 5A, FIG. 5B, and FIG. 5C, α>α" and β<β", and Q<Q' in the conversion curve. However, the difference between these pairs of values are close to each other. Accordingly, only a slight decrease and increase are present and there is not much difference after the conversion even though the lower limit decreases from α to α" and the upper limit increases from β to β". In other words, the levels of gradation are not very much changed after the conversion compared with the levels of gradation of the original image. This indicates that almost no tone correction is done.

During or after the calculation of the conversion curve, α' may be converted such that α'=α, and β' or the conversion curve may be recalculated accordingly. This is not limited to α', but such conversion and recalculation may be performed for β', α", β" in a similar manner to the above.

According to the above description, it is desired that a fog image be treated as follows. An area with high optical transmittance is provided with a smaller clipping value to decrease the degree of the contrast adjustment, and an area with low optical transmittance is provided with a larger clipping value to increase the degree of the contrast adjustment.

While the optical transmittance may be measured by the transmittance measuring sensor 17, the transmittance may be calculated from an image by performing image processing. As a method of calculating the transmittance, a method using a dark channel will be described below. For the detail of this method, see, for example, "Single image Haze removal Using Dark Channel Prior; He Kaiming, Jian Sun, Xiaoou Tang; Pattern Analysis and Machine Intelligence, IEEE 2011" and JP-2012-221237-A.

When the smallest RGB value at a local area of the fog image is calculated from the properties of the fog, data that correlates with a rough transmittance of the fog can be obtained. Such data is referred to as a dark channel. A model formula of the fog can be expressed in the following formula 1, where J denotes the image data of cases where there is no fog, t (t=0 to 1) denotes the transmittance of the air, A denotes the light in the air (indirect-light components), and I denotes the image data of cases where there is fog.

$$I = J \times t + (1-t) \times A \qquad \text{[Formula 1]}$$

In the formula 1 as above, "J×t" is referred to as direct-light data, and indicates the state in which an image when the fog with the optical transmittance of 100 percent clears off is attenuated by the transmittance t. In the formula 1 as above, "(1−t)×A" is referred to as indirect-light data, and indicates the state in which the image attenuated by the direct light is brightened by the light in the air A.

The dark channel holds for the property that the smallest RGB value of most substance is about zero when the fog clears off. According to the formula 1, as the transmittance t is smaller, the components of the light in the air increase and the value of the light in the air increases. On the other hand, the value of the direct-light data gets close to zero as the transmittance t is smaller. Accordingly, the direct-light data is assumed to be zero, and a rough estimate of the transmittance t can be obtained from calculations using the value of the light in the air A.

In order to make the minimum value of "J" even closer to zero, the local areas are set to be divided areas of small size such as "15×15", and the minimum value can be calculated for each of these areas. It is to be noted that the smallest RGB value of a large white object or the like becomes almost zero regardless of the state of the fog. For this reason, the transmittance of such a large white object or the like cannot precisely be calculated using the dark channel.

Under the conditions as described above, the relational expression between the dark channel and the transmittance t, which is derived from the model formula of the formula 1, is expressed in the following formula 2. In the formula 2, "Ω" denotes the local area for a target pixel, and "$\min_c$" indicates the smallest RGB value.

$$t = 1 - \min_{y \in \Omega}\left(\min_c\left(\frac{J}{A}\right)\right) \qquad \text{[Formula 2]}$$

The formula 2 as described above is used to calculate and obtain the transmittance t or the dark channel dark $\min_{y \in \Omega}$ ($\min_c(J)$). In the following description, the dark channel is referred to as dark(J). The transmittance calculator 22 illustrated in FIG. 2 uses the formula 2 as described above to calculate and obtain the transmittance t or the dark channel dark(J), and outputs the calculated transmittance as transmittance data to the contrast adjuster 23. The contrast adjuster 23 determines the clipping value k to be used in the CLAHE according to the transmittance t or the dark channel dark(J).

The clipping value k of the CLAHE may be determined without considering the above-described transmittance data, using the following formula 3 and formula 4.

$$k\_min = \frac{m}{N} \quad \text{[Formula 3]}$$

$$k = k\_min + (m - k\_min) \times S \quad \text{[Formula 4]}$$

In the formula 3, "m" denotes the number of the pixels of each tile, and "N" denotes the number of the bits of each pixel. The number of bits is 256 for an 8-bit image, and 65536 for a 16-bit image. "k_min" denotes a minimum clipping value. In the formula 4, a set value S is a value ranging from 0 to 1. When the set value S is 1, it means a state where there is almost no constraint by the clipping value.

The clipping value of the CLAHE in view of the transmittance data may be calculated using the following formula 5 obtained by modifying the formula 4, where the average of the transmittance t per one tile is a tile transmittance T, and the average of the dark channel dark(J) per one tile is a tile dark channel dark(J).

$$k = k\_min + (m - k\_min) \times S \times \{(1-T) \times \alpha 1 + \beta 1\}$$

or $$k = k\_min + (m - k\_min) \times S \times \{dark(J) \times \alpha 2 + \beta 2\} \quad \text{[Formula 5]}$$

By using the formula 5 as described above, the clipping value of the CLAHE varies for each transmittance of the tiles, and the clipping value of a tile with low transmittance can be increased and the clipping value of a tile with high transmittance can be decreased. In the formula 5, the values α1, β1, α2, and β2 indicate the degree of the weighting made by the linear transformation of the transmittance t, and clipping is done when the result of the linear transformation exceeds 1. For example, when the sensitivity of the transmittance is increased such that the clipping value largely varies even for a difference with small transmittance, the values of α1, α2, β1, and β2 may be determined such that the maximum value of the tile dark channel in the entire image becomes 1 and the minimum value of the tile dark channel becomes 0.

The contrast adjuster 23 uses the formula 5 as described above to calculate the clipping value for each tile, and uses the clipping value to performs the CLAHE processing. As described above, the formula 5 may be used to calculate a clipping value. Alternatively, some clipping values that correspond to the transmittance data are set to a table or the like, and a clipping value may be determined by referring to the table. When the image is an RGB image, the RGB color space may be converted into the YCbCr color space or the like before performing the CLAHE processing. In other words, the color space may be converted using any known formula or the like. The contrast adjuster 23 may use the converted Y (brightness value) to make the histogram flattened as described above.

The contrast adjuster 23 may just perform the CLAHE processing, but the fog image may become achromatic and the color saturation may become insufficient when only the CLAHE processing is done. In such cases, the color saturation may be enhanced by increasing the Cb components and the Cr components in the YCbCr color space. Cb denotes the color difference components indicating the hue and color saturation of blue color or bluish color, and Cr denotes the color difference components indicating the hue and color saturation of red color or reddish color.

The color saturation adjustment in which the gain of the Cb and Cr components is increased may be performed using the following formula 6. Note that in the formula 6, Cb and Cr takes a value varying between −1 and 1. Moreover, in the formula 6, x of Cx indicates b or r. Cx' indicates the value of Cb or Cr where the color saturation has been adjusted.

$$0 > Cx$$

$$Cx' = -1 + \{(Cx+1)\}^{\wedge}(1+[S \times \{(1-T) \times \alpha 3 + \beta 3\}])$$

$$0 \le Cx$$

$$Cx' = 1 - \{(1-Cx)\}^{\wedge}(1+[S \times \{(1-T) \times \alpha 3 + \beta 3\}])$$

or $$0 > Cx$$

$$Cx' = -1 + \{(Cx+1)\}^{\wedge}[1 + \{S \times (dark(J) \times \alpha 4 + \beta 4\}])$$

$$0 \le Cx$$

$$Cx' = 1 - \{(1-Cx)\}^{\wedge}[1 + \{S \times (dark(J) \times \alpha 4 + \beta 4\}]) \quad \text{[Formula 6]}$$

In a similar manner to the clipping value of the CLAHE, in the formula 6 as described above, the gain decreases as the transmittance is greater, and the gain increases as the transmittance is smaller. In a similar manner to the clipping value of the CLAHE, in the formula 6 as described above, the values α3, α4, β3, and β4 indicate the degree of the weighting made by the linear transformation of the transmittance t.

FIG. 7A, FIG. 7B, and FIG. 7C are diagrams illustrating the gain used in color saturation adjustment according to an embodiment of the present invention. Here, how the gain changes as the characteristic part of the formula 6 varies from 1 to 3 is described with reference to FIG. 7A, FIG. 7B, and FIG. 7C. FIG. 7A indicates the cases in which the characteristic part of the formula 6 is 1. FIG. 7B indicates the cases in which the characteristic part of the formula 6 is 2. FIG. 7C indicates the cases in which the characteristic part of the formula 6 is 3. When the characteristic part is 1, the ratio of Cx' to Cx is 1. As the characteristic part increases to 2 and 3, the ratio increases, and the gain also increases. The characteristic part of the formula 6 includes the transmittance data. For this reason, the color saturation is adjusted using the formula 6 as described above, and the gain of the color saturation adjustment can be determined according to the transmittance data.

FIG. 8 is a flowchart of a flow of the contrast adjustment performed by the imaging device 10 provided with the image processing circuit 18 illustrated in FIG. 2. The processes that are performed by the imaging device 10 are described below with reference to FIG. 8. The lens unit 11 of the imaging device 10 is directed to an any desired object to be captured, and the shutter button is depressed. After that, in the step S810, the capturing unit 12 captures an image. In the present embodiment, the fog is to be removed. However, as a matter of course, the bai, the PM 2.5, or the like other than the fog may be a target to be removed. When the fog is to be removed, whether or not to adjust the fog may be determined manually through the operation unit 15. The imaging device 10 removes the fog according to the determination made through the operation unit 15. Note that some type of the imaging device 10 can automatically detect whether the fog is present in the captured image. Such a device can automatically adjust the fog without bothering the user.

In the step S810, the controller 13 is notified of the depressed shutter button, and instructs the capturing unit 12 to start capturing an image. According to the instruction, the capturing unit 12 opens the shutter to expose an imaging element, and photoelectrically converts the light that enters the imaging element. As a result, image data is output. In the step S820, the controller 13 receives the image data, and stores the received image data in the image memory 14.

In the step S830, the CTL I/F 20 of the image processing circuit 18 obtains the image data from the image memory 14, and the ISP unit 21 performs image processing such as shading correction. After that, the image data is sent to the transmittance calculator 22 and the contrast adjuster 23. The transmittance calculator 22 uses the formula 2 as described above to calculate and obtain transmittance data such as the transmittance t or the dark channel dark(J). The transmittance calculator 22 outputs the calculated transmittance data to the contrast adjuster 23.

In the step 840, the CLAHE processor 24 of the contrast adjuster 23 uses the transmittance data to calculate and determine the clipping value using the formula 5 as described above. In the step S850, the CLAHE processor 24 uses the determined clipping value to flatten the histogram of each tile as described above. Accordingly, a conversion curve is obtained for each tile. Then, the CLAHE processor 24 uses the obtained conversion curves to convert the brightness values of the pixels of each tile. As described above, the CLAHE processor 24 adjusts the brightness components of the pixels. The CLAHE processor 24 sends the adjusted image data to the color saturation adjuster 25.

In the step S860, the color saturation color saturation adjuster 25 performs color saturation adjustment on the color difference components other than the brightness components in the pixels of the image data. The color saturation adjuster 25 uses the formula 6 as described above to increase the gain of the color saturation components. By so doing, the color saturation improves. When the color saturation of all the pixels have been adjusted, the contrast adjuster 23 assumes that the contrast adjustment is complete, and stores the image data in the image memory 14 through the CTL I/F 20. When the storage in the image memory 14 is complete, the imaging device 10 terminates the process.

The imaging device 10 includes the lens unit 11. The lens unit 11 includes a zoom lens that can capture an image upon changing the focal length and magnifying an object to be captured. The lens data that is set for the zoom lens includes setting information such as the angle of view and the zoom magnification power. The angle of view or the magnifying power may be changed by modifying the setting information. The angle of view indicates the capturing range, and has a greatest value and a smallest value for a wide rim and a tele-rim, respectively. The wide rim indicates a state where the focal length of the zoom lens is made shortest, and the tele-rim indicates a state where the focal length of the zoom lens is made longest. The zoom magnification power is the magnification power for the wide rim when the focal length of the zoom lens is changed from the wide rim. For example, when the focal length for the wide rim is 35 millimeters (mm) and the focal length at that time is 70 mm, the zoom magnification power is 2. The lens data such as the angle of view or zoom magnification power of the lens unit 11 is stored in the memory provided for the controller 13.

Figure 9A:
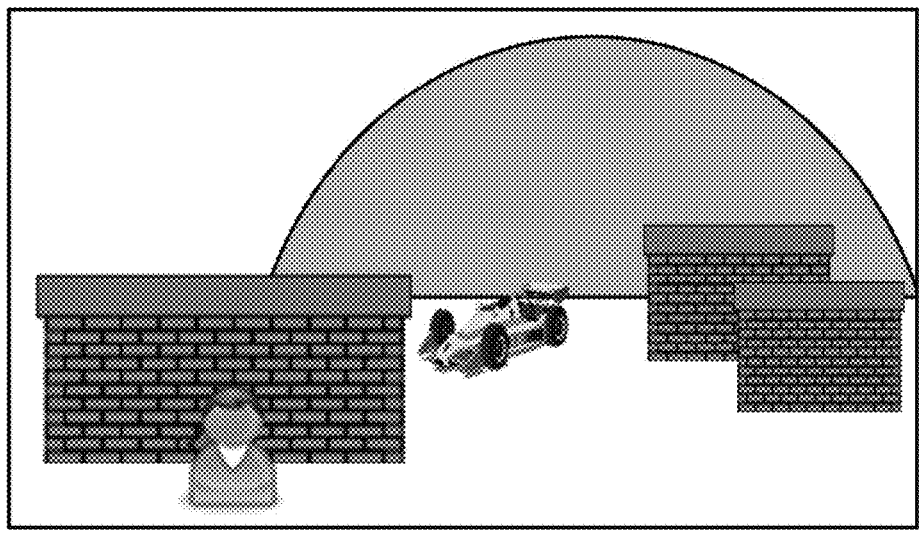
FIG. 9A and FIG. 9B are diagrams illustrating a wide rim and a tele-rim according to an embodiment of the present invention.
Figure 9B:
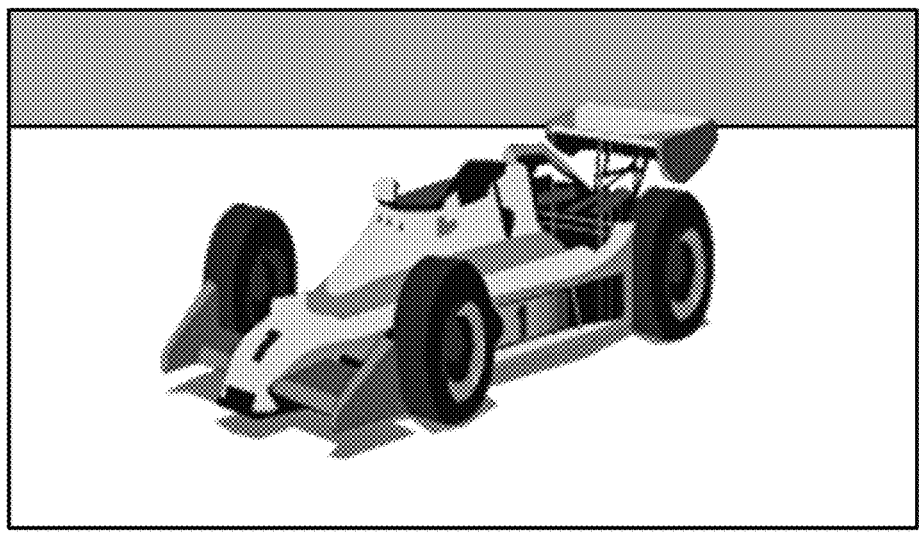

In the wide rim as illustrated in FIG. 9A, not only the person whose distance to the imaging device 10 is short but also the mountain and sky whose distance to the imaging device 10 is long are captured. Accordingly, in the wide rim as illustrated in FIG. 9A, it is considered that the differences in transmittance on this captured single image are large. By contrast, in the tele-rim as illustrated in FIG. 9B, only the car whose distance to the imaging device 10 is short is captured. On this captured single image, the differences in depth dimension are small. Accordingly, in the tele-rim as illustrated in FIG. 9B, it is considered that the differences in transmittance on the captured single image are small. In view of the above circumstances, in the method where the dark channel is used, it is desired that the correction for cases with low accuracy of transmittance be performed. When such correction is performed, the clipping value is widely changed for the wide rim, and the clipping value is not so much changed for the tele-rim.

The angle of view or the zoom magnification power serves as a parameter indicating the degree to which a portion of the image is close to the wide rim or the tele-rim, and enables estimation of the degree of variations in the transmittance in the image. For this reason, the CLAHE processor 24 obtains the lens data from the controller 13 to determine a more appropriate clipping value using the obtained lens data and the dark channel.

The clipping value k can be calculated by the following formula 7 obtained by modifying the formula 5 as described above, using lens setting data L that corresponds to the lens data. The value of L is set to 1, 0, 0.5 for the wide rim, the tele-rim, and the middle point between the wide rim and the tele-rim, respectively. Moreover, the value of L becomes closer to 0 as it gets closer to the wide rim from the middle point, and the value of L becomes closer to 1 as it gets closer to the tele-rim from the middle point. However, L is not limited to the above configuration. For example, the focal length or angle of view of the lens may be converted into a numerical form, and the value of L may be set to the obtained number.

$$k = k\_\min + (m - k\_\min) \times S \times \{1 - L \times (T \times \alpha 1 + \beta 1)\}$$

or $$k = k\_\min + (m - k\_\min) \times S \times [1 - L \times \{(1 - \text{dark}(J) \times \alpha 2 + + \beta 2)\}] \quad \text{[Formula 7]}$$

In the formula 7, $\alpha 1$, $\alpha 2$, $\beta 1$, and $\beta 2$ are the smallest and largest values of the transmittance of all the dark(J) or all the tiles, and $\alpha 1$, $\alpha 2$, $\beta 1$, and $\beta 2$ are normalized to between 0 and 1. The clipping value k is determined using the formula 7. When the value of L is large and the closeness to the wide rim is indicated, the clipping value widely changes. On the other hand, when the value of L is small and the closeness to the tele-rim is indicated, the clipping value barely changes.

As described above, the lens data may be used to improve the accuracy of transmittance. Moreover, the lens data may be used not only to adjust the brightness but also to adjust the color saturation, and the accuracy of the color saturation thereby improves. Accordingly, the values for the color saturation adjustment can also be calculated using the lens setting data L, and using the following formula 8 obtained by modifying the formula 6 as described above. In the formula 8, α3, α4, β3, and β4 are normalized in a similar manner to α1, α2, β1, and β2 in the formula 7 as described above.

$$0 > Cx$$

$$Cx' = -1 + \{(Cx+1)\}^\wedge(1 + [Sx\{1 - Lx(Tx\alpha3 + \beta3)\}])$$

$$0 \leq Cx$$

$$Cx' = 1 - \{(1-Cx)\}^\wedge(1 + [Sx\{1 - Lx(Tx\alpha3 + \beta3)\}])$$

or $$0 > Cx$$

$$Cx' = -1 + \{(Cx+1)\}^\wedge\{1 + (Sx[1 - Lx\{(1-\text{dark}(J))\times \alpha4 + \beta4\}])\}$$

$$0 \leq Cx$$

$$Cx' = 1 - \{(1-Cx)\}^\wedge\{1 + Sx[1 - Lx\{(1-\text{dark}(J)\times \alpha4 + \beta4)\}])\}$$  [Formula 8]

The flow of the processing in which lens data is obtained and a clipping value is determined and color saturation is adjusted according to the obtained lens data is briefly described with reference to FIG. 10. As the steps S1010 to S1030 are similar to the steps S810 to S830 depicted in FIG. 8, the description of these steps is omitted. In the step 1040, the CLAHE processor 24 of the contrast adjuster 23 obtains the lens data from the controller 13.

Although the processes in the steps S1050 to S1070 are similar to the processes in the steps S840 to S860 depicted in FIG. 8, the lens setting information L and the formulas 7 and 8 as described above are used to determine a clipping value and adjust the color saturation in the steps S1050 to S1070.

When the sky is captured in the fog image, the distance between the imaging device 10 and the sky is further than the distance between the imaging device 10 and a person or mountain, and thus the optical transmittance of the sky is small. For this reason, if the formula 5 as described above is used to determine a clipping value, the clipping value becomes large. Moreover, if the CLAHE is performed, the contrast is greatly enhanced. When the fog comes up, the sky area does not include any particular information. In such cases, the enhancement of contrast just leads to an increase in noise. In order to avoid such situation, it is desired that the clipping value for the sky area detected in an image be small regardless of the transmittance data. By so doing, the noise can be reduced.

Figure 11:
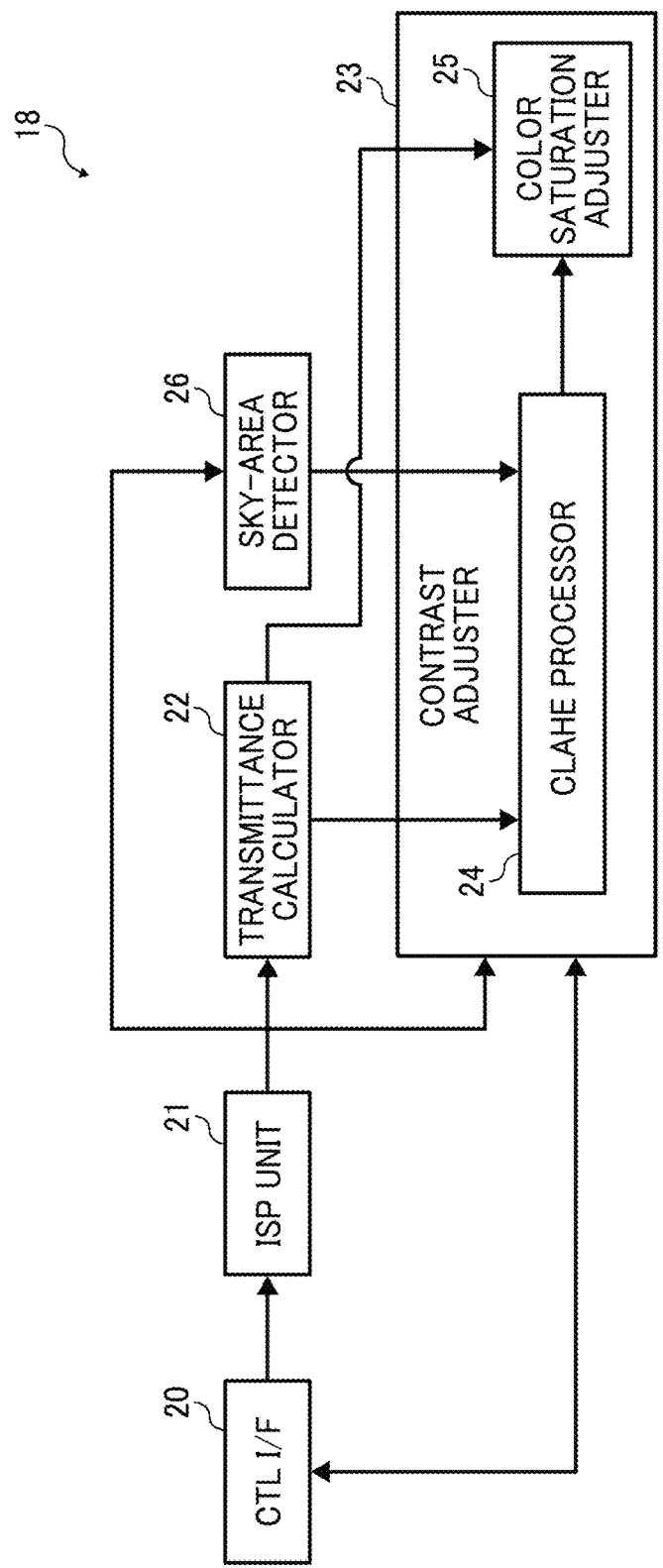
FIG. 11 is a functional block diagram illustrating another example of an image processing device according to an embodiment of the present invention.

As illustrated in FIG. 11, the image processing circuit 18 may further be provided with a sky-area detector 26 that detects the sky area of an image. The other aspects of the configuration are similar to the configuration illustrated in FIG. 2. The sky area can be detected using any technology known in the art. For example, see "Single Image Algorithm Based on Sky Region Segmentation" (2013), Information Technology Journal 12(6): 1168-1175. In this known technology, noise is removed using the morphology processing based on the characteristics that the sky area is wide, bright, and edgeless, and binarization is performed. Alternatively, for example, a method in which machine learning is used to recognize the sky area may be adopted.

Figure 12:
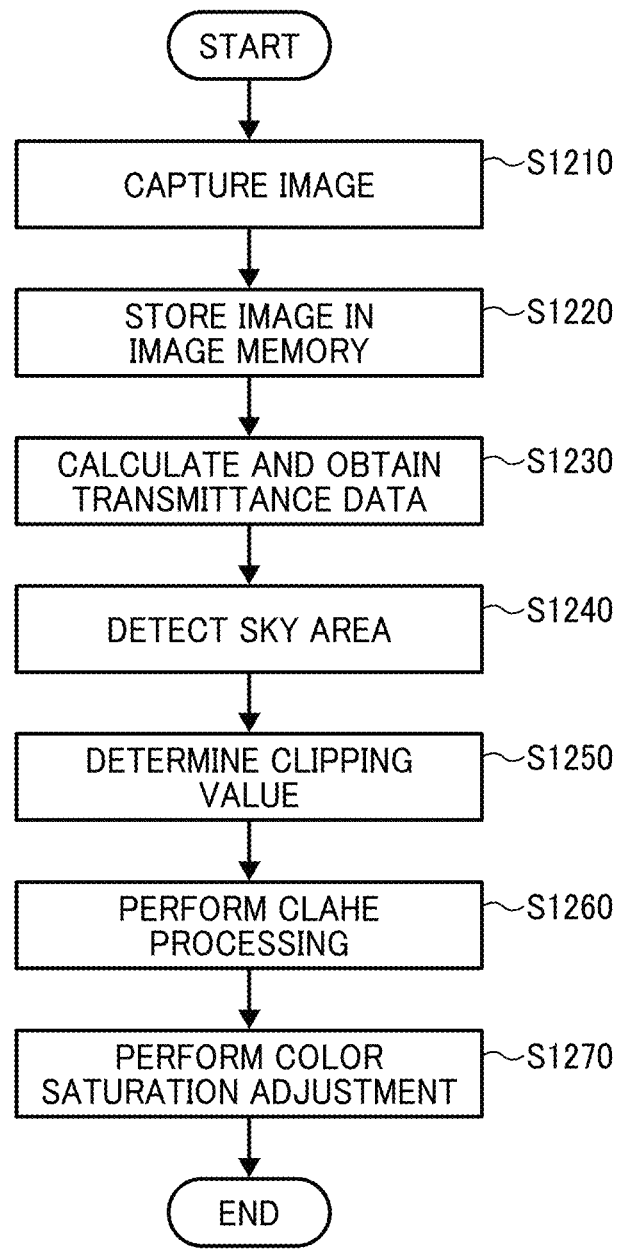
FIG. 12 is a flowchart of the flow of the contrast adjustment performed by an imaging device provided with the image processing device illustrated in FIG. 11.

The processes that are performed by the imaging device 10 provided with the sky-area detector 26 are described below with reference to FIG. 12. The processes in the steps S1210 to S1230 are similar to the processes in the steps S810 to S830 depicted in FIG. 8 as well as the processes in the steps S1010 to S1030 depicted in FIG. 10. Accordingly, the description of the processes in the steps S1210 to S1230 is omitted. In the step S1240, the sky-area detector 26 detects the sky area in the image at the same time as when the transmittance calculator 22 calculates and obtains the transmittance data. Alternatively, the sky-area detector 26 may detect the sky area in the image after the transmittance calculator 22 has calculated and obtained the transmittance data. Subsequently, the sky-area detector 26 sends the data of the detected sky area to the CLAHE processor 24 of the contrast adjuster 23.

Figure 10:
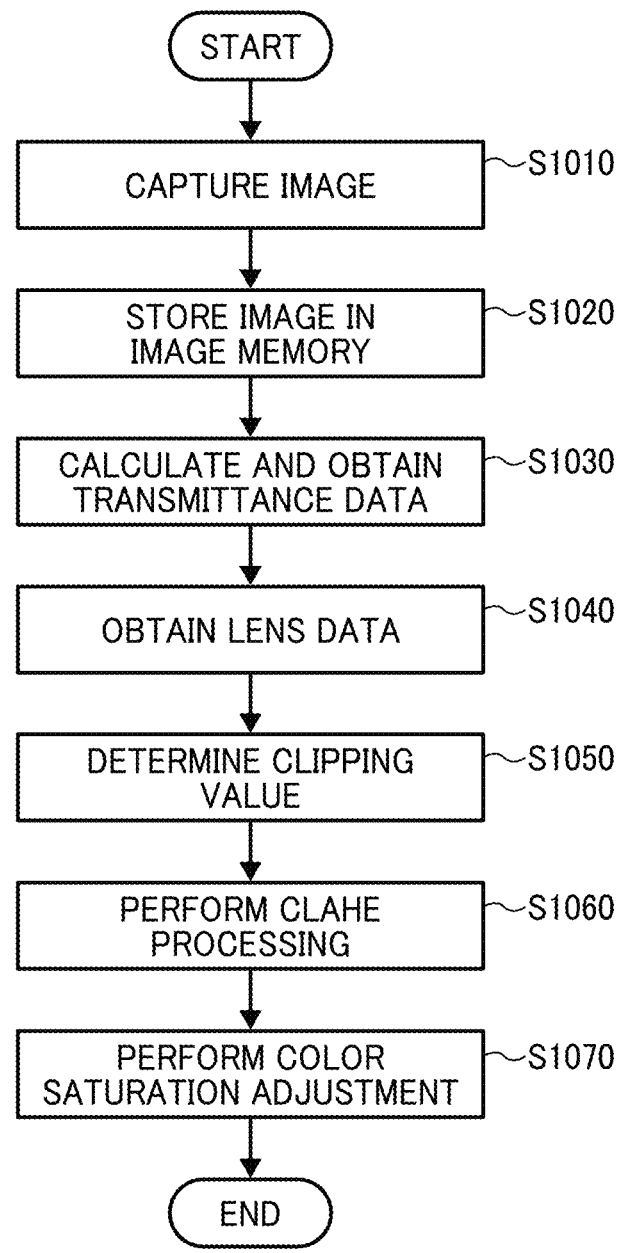
FIG. 10 is a flowchart of another flow of the contrast adjustment performed by an imaging device, according to an embodiment of the present invention.

The processes in the steps S1250 to S1270 are similar to the processes in the steps S840 to S860 depicted in FIG. 8 as well as the processes in the steps S1050 to S1070 depicted in FIG. 10. However, in the determination of the clipping value in the steps S1250, the detected sky area serves, for example, to set the clipping value to a minimum value, and to inhibit the contrast adjustment. Note that the sky area may directly be output to the color saturation adjuster 25 just as it is. In such cases, the CLAHE processor 24 does not at all perform the CLAHE processing on the sky area.

As the contrast adjustment is not so much performed or not at all performed on the sky area, the noise in the sky area is reduced, and the image quality of the fog-adjusted image improves. In the present embodiment, cases of the sky area are described as an example. In a similar manner to this method, an area in which contrast adjustment is not very much desired may be extracted, and the clipping value of the extracted area may be set to a minimum value. Moreover, the extracted area may be output without performing the contrast adjustment thereon.

In the above description, an area in which the contrast adjustment is not very much desired has been described. On the contrary, there exists an area in which the contrast adjustment is to be performed actively. For example, such an area includes a road area when an image is captured by a vehicle-installed camera. When a vehicle-installed camera is used as a part of a drive recorder, an objet to be captured is a vehicle or object on the road. When a vehicle-installed camera is for automatic driving, an objet to be captured includes a vehicle, a pedestrian, a traffic sign, and a traffic signal, which are mainly objects on the road.

Figure 13A:
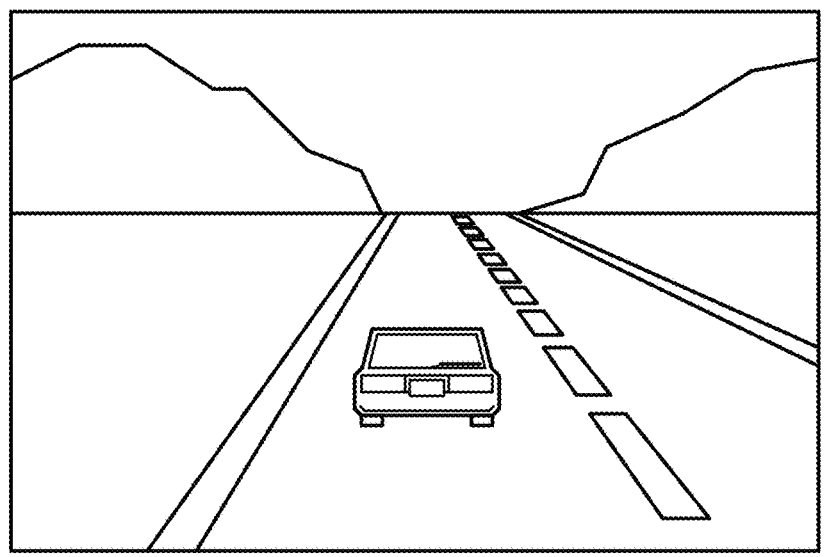
FIG. 13A and FIG. 13B are diagrams illustrating the detection of a road area, according to an embodiment of the present invention.
Figure 13B:
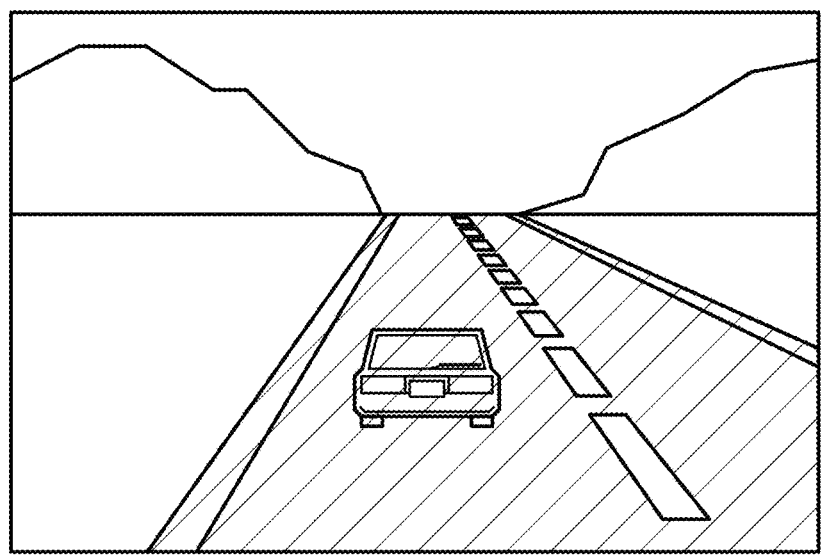

In such an area, a large value is set to the clipping value contrary to the above-described area in which the contrast adjustment is not very much desired. Accordingly, the visibility of that area improves at all times regardless of the transmittance. In the present embodiment, cases in which such an area is a road area will be described as an example. However, no limitation is intended thereby. FIG. 13A is a diagram illustrating an example of the image captured by the imaging device 10, according to the present embodiment. FIG. 13B is a diagram illustrating the image of FIG. 13A in which a road area is detected, according to the present embodiment.

Various kinds of technology to detect a road area have been known in the art. For example, see JP-07-028975-A. In the technology disclosed in JP-07-028975-A, the white lines on the right and left sides are detected, and an area within these two white lines is recognized as a lane. However, the road area is not just the lane on which the vehicle travels forward. It is desired that the area indicated by oblique lines as illustrated in FIG. 13B including the lane on which the vehicle travels from the opposite direction be detected.

Figure 14:
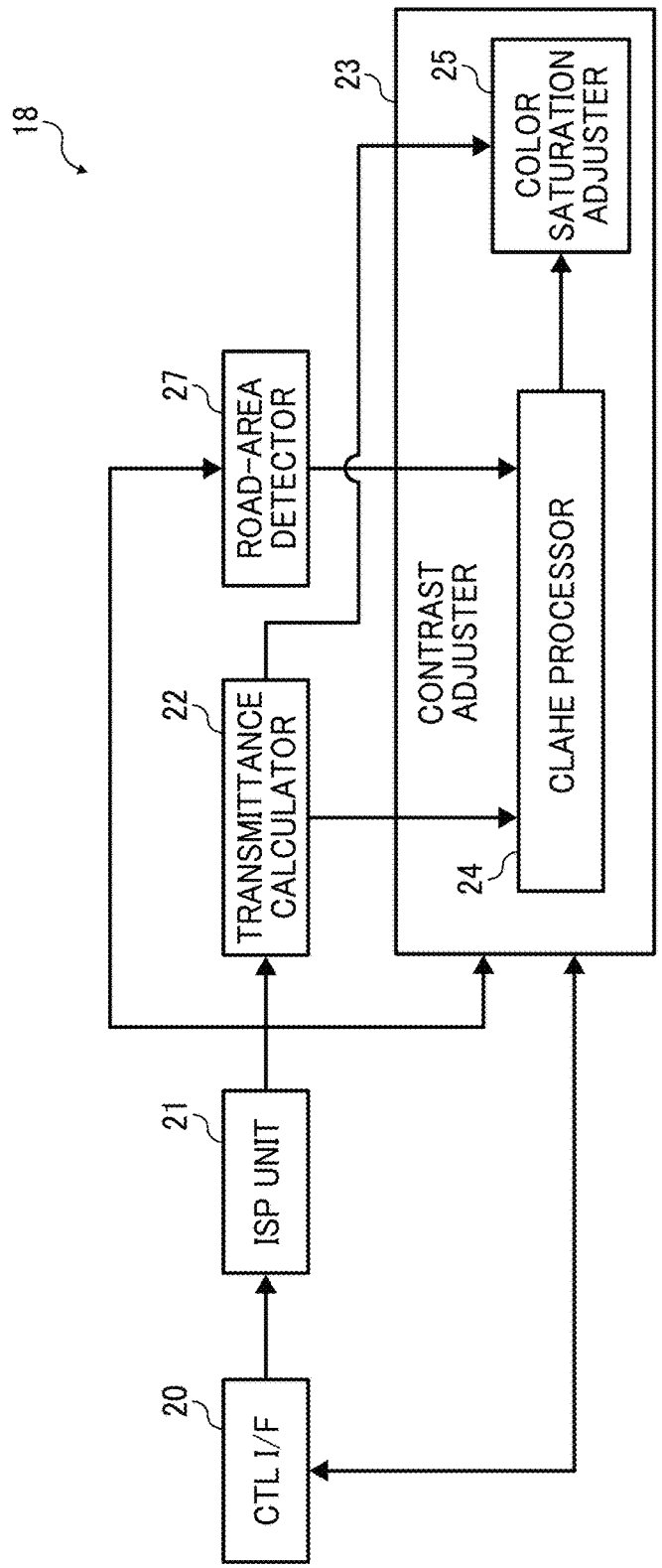
FIG. 14 is a functional block diagram illustrating further another example of an image processing device according to an embodiment of the present invention.

In view of the above circumstances, as illustrated in FIG. 14, the image processing circuit 18 may further be provided with a road-area detector 27 that detects the road area. The other aspects of the configuration are similar to the configuration illustrated in FIG. 2. In a similar manner to the sky-area detector 26, the road-area detector 27 obtains the image data from the ISP unit 21, and detects a road area from the image of the obtained image data. The road-area detector 27 sends the data of the detected road area to the contrast adjuster 23. The contrast adjuster 23 determines the clipping value such that the CLAHE processor 24 improves the contrast of the road area.

In order to vary the clipping value depending on whether the area belongs to a road area or whether the area is close to or far from the road area, a for-road control parameter D is used. The formula 9 given below indicates a formula to calculate the clipping value using such a for-road control parameter D. The for-road control parameter D provides "0" for a road area, and provides "1" for an area distant from the road area by the distance equal to or greater than a prescribed distance. Moreover, the for-road control parameter D provides a value ranging from 0 to 1 for an area distant from the road area by the distance shorter than the prescribed distance. Note that the value ranging from 0 to 1 is made proportionate to the distance to the road area.

$$k = k\_min + (m - k\_min) \times S \times \{1 - D \times (T \times \alpha 1 + \beta 1)\}$$

or $$k = k\_min + (m - k\_min) \times S \times [1 - D \times \{(1 - dark(J) \times \alpha 2 + \beta 2)\}]$$ [Formula 9]

By using the formula 9, the clipping value can be calculated in view of the transmittance data such that the clipping value becomes larger as the area is closer to the road area and the clipping value becomes smaller as the area is further from the road area. In a similar manner to the above, the for-road control parameter may be used not only to adjust the brightness but also to adjust the color saturation, and the accuracy of the color saturation thereby improves. Its formula is given as the formula 10 as below.

$$0 > Cx$$

$$Cx' = -1 + \{(Cx+1)\}^{\wedge}(1 + [S \times \{1 - D \times (T \times \alpha 3 + \beta 3)\}])$$

$$0 \leq Cx$$

$$Cx' = 1 - \{(1 - Cx)\}^{\wedge}(1 + [S \times \{1 - D \times (T \times \alpha 3 + \beta 3)\}])$$

or $$0 > Cx$$

$$Cx' = -1 + \{(Cx+1)\}^{\wedge}\{1 + (S \times [1 - D \times \{(1 - dark(J)) \times \alpha 4 + \beta 4\}])\}$$

$$0 \leq Cx$$

$$Cx' = 1 - \{(1 - Cx)\}^{\wedge}\{1 + S \times [1 - D \times \{(1 - dark(J) \times \alpha 4 + \beta 4)\}])\}$$ [Formula 10]

Figure 15:
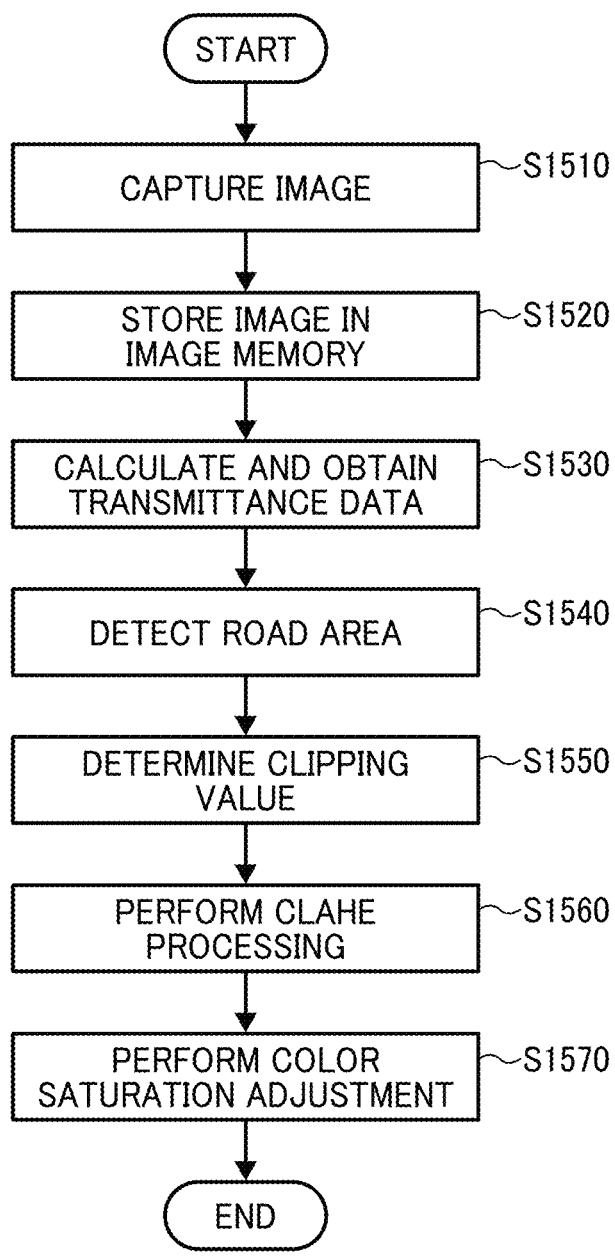
FIG. 15 is a flowchart of the flow of the contrast adjustment performed by an imaging device provided with the image processing device illustrated in FIG. 14.

The processes that are performed by the imaging device 10 provided with the road-area detector 27 are described below with reference to FIG. 15. The processes in the steps S1510 to S1530 are similar to the processes in the steps S810 to S830 depicted in FIG. 8. Accordingly, the description of the processes in the steps S1500 to S1530 is omitted. In the step 1540, the road-area detector 27 detects a road area in the image at the same time as when the transmittance calculator 22 calculates and obtains the transmittance data. Alternatively, the road-area detector 27 may detect a road area in the image after the transmittance calculator 22 has calculated and obtained the transmittance data. Subsequently, the road-area detector 27 sends the data of the detected road area to the CLAHE processor 24 of the contrast adjuster 23.

The processes in the steps S1550 to S1570 are similar to the processes in the steps S840 to S860 depicted in FIG. 8. However, in the determination of the clipping value in the steps S1550, the road area serves, for example, to set the clipping value of the road area to a value greater than the clipping value of the other areas, and to enhance the contrast adjustment.

In the above description, the processes in which the contrast of a fog image is adjusted using the transmittance data have been described as an example. When the contrast of a fog image is adjusted as described above, an image is divided into a plurality of rectangular tiles according to a division condition that an image is to be divided into a plurality of rectangular tiles, and a clipping value is determined for each of the tiles. Then, the CLAHE is performed to adjust the color saturation. If the image is divided into tiles as above, like a house as illustrated in FIG. 16A, the parameters for the image processing of the objects that extend over the boundary of tiles changes at the boundaries. For this reason, a difference will be present in the result of the image processing. As a result, an image on which the image processing has been performed becomes a somewhat unnatural image.

In order to avoid such situation, the technology is known in which the shapes of objects are extracted by performing texture analysis and the area is divided for each of the objects, as disclosed in JP-3543103-B. By dividing the objects as described above, the above-mentioned unnatural image can be avoided. However, when the fog is thick in the image as illustrated in FIG. 16B, it is difficult to extract the shapes of objects, and thus it is difficult to divide the area for each of the objects. Even if the area is successfully divided, the length of time spent for such processing is enormous, and it is difficult to complete the processes in real time.

In order to improve the contrast affected by the fog, the area is divided according to the degrees of influence brought by the fog, and the contrast is adjusted for each of the divided areas. By so doing, a natural image where there are little blooming whites or blocked up shadows can be output. As a method of dividing the area, for example, a method in which a dimmed image is used may be used. In such a method, a dimmed image is generated by image processing, and the area is divided into a plurality of areas according to the pixel values of the generated dimmed image. As described above, when this method is used, the division condition is a condition that an image is to be divided according to the pixel values of the generated dimmed image, in place of the condition that an image is to be divided into a specified number of tiles.

As will be described later in detail, a dimmed image in which the levels of the pixel values are adjusted to five levels from white to black as illustrated in FIG. 17 is generated. Although cases in which the image is divided into five levels are described herein, the image may be divided into any number of levels. The original image is divided into a plurality of areas according to the pixel values of the dimmed image. The white area in the dimmed image is a sky area, and thus does not require any improvement in contrast. For this reason, as illustrated in FIG. 17, the image is divided into four areas. Note that the building and the street lamp in the image have the pixel values of the same level in the dimmed image, and thus the building and the street lamp can be treated as a same region. Accordingly, the contrast can be adjusted for each of the areas divided as above.

The dimmed image is described in detail with reference to FIG. 17. In a dimmed image, the depth dimension is at a shorter distance as the pixel value is smaller (darker), and the depth dimension is at a longer distance as the pixel value is larger (brighter). In the dimmed image, the levels of the depth dimension as described above are changed according to the distance from the imaging device 10 to an object to be captured. Accordingly, the dimmed image can be generated based on the distance data obtained by distance measurement using image processing such as stereo matching where a plurality of imaging device are used or distance measurement using a laser radar or the like where the image processing is not performed.

The brightness value of the dimmed image does not only depend on the distance from the imaging device 10 to an object to be captured, but also depends on the transmittance. The fog has a smaller transmittance when the fog is further from the imaging device 10, and has a larger transmittance when the fog is closer to the imaging device 10. In other words, the transmittance becomes larger when the pixel values of the dimmed image are small, and the transmittance becomes smaller when the pixel values of the dimmed image are large. For this reason, a transmittance measuring unit that measures the transmittance may be used in place of the dimmed image, and the area may be divided according to the transmittance measured by the measuring unit.

Next, a method of generating a dimmed image is described with reference to (a) to (d) of FIG. 18. The method of generating a dimmed image is similar to the above-described method using a dark channel. In the present example, the original image is an RGB image. The smallest RGB value is selected for each of the pixels that make up the original image illustrated in (a) of FIG. 18. Each of the pixels has pixel values for the respective R, G, and B, and the smallest value is selected from these pixel values. By selecting smallest RGB value as described above, an appropriate dimmed image can be generated for a light source such as the street lamp, unlike the cases in which the level of lightness is simply selected.

Next, as illustrated in (b) of FIG. 18, the pixels in a prescribed area 31 that includes a pixel (target pixel) 30 selected from the image for which smallest RGB values have been selected, excluding the target pixel 30, are determined to be the peripheral pixels, and the pixel values of the target pixel 30 and the peripheral pixels are substituted by the smallest RGB value of the peripheral pixels. By making full use of the data of the peripheral pixels as described above, the pixel values of objects with the same distance to the imaging device 10 but with varying pixel values, such as the wall and window of a building, can be substituted by the same pixel value. The prescribed area 31 may be determined as desired. The prescribed area may be, for example, an area composed of nine pixels in total encompassing the target pixel 30 as the center.

If the pixel values are successively substituted according to the data of the peripheral pixels, some pixel values that do not have to be replaced may also be converted unnecessarily. For example, when only the peripheral pixels on the right and bottom sides of the target pixel 30 are actually to be replaced, the peripheral pixels on the top and left sides of the target pixel 30 may unnecessarily be replaced. In such cases, the objects in the image expand as illustrated in (c) of FIG. 18. In (c) of FIG. 18, all the objects in the image, i.e., the mountains, the house, the street lamp, and the building, are expanded.

If the contrast is adjusted in such a state, a halo appears at the boundaries of the objects. In order to avoid the appearance of such a halo, the edges are corrected such that the original shapes of the objects match the shapes in the dimmed image. A general-purpose image processing method such as a guided filtering where the original image is utilized may be used to correct the edges.

As described above, firstly, the smallest RGB values are selected, and secondly, the pixel value of the target pixel 30 is replaced with smallest RGB value of the peripheral pixels. Finally, the edges are corrected, and the dimmed image can be generated as illustrated in (d) of FIG. 18. An RGB image having three factors is used in the present embodiment, but no limitation is intended thereby. However, the method as described above cannot be applied to color spaces such as Lab having levels of lightness and other factors and YUV having levels of brightness and other factors.

As illustrated in (a) to (d) of FIG. 18, a dimmed image may be generated from an original image. Alternatively, as illustrated in FIG. 17, a dimmed image may be generated using the distance data and the transmittance data. Note that when the pixel values of an original image are expressed by the 256-level gray scale, the pixel values of a dimmed image are also expressed by the 256-level gray scale in the same way as the original image. Accordingly, when an image is divided into areas based on the pixel values, the pixel values are delimited into ranges as desired and the pixels having the pixel values in the same range may be defined to be in a same area.

Figure 19A:
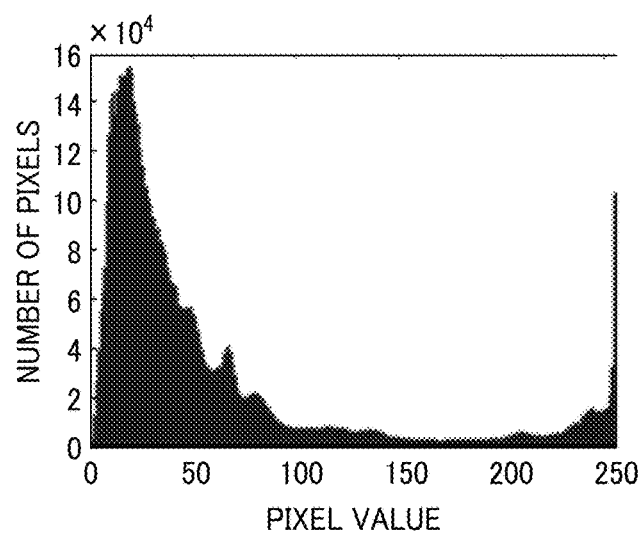
FIG. 19A, FIG. 19B, and FIG. 19C are diagrams illustrating another method of dividing the pixel values of a dimmed image, according to an embodiment of the present invention.
Figure 19B:
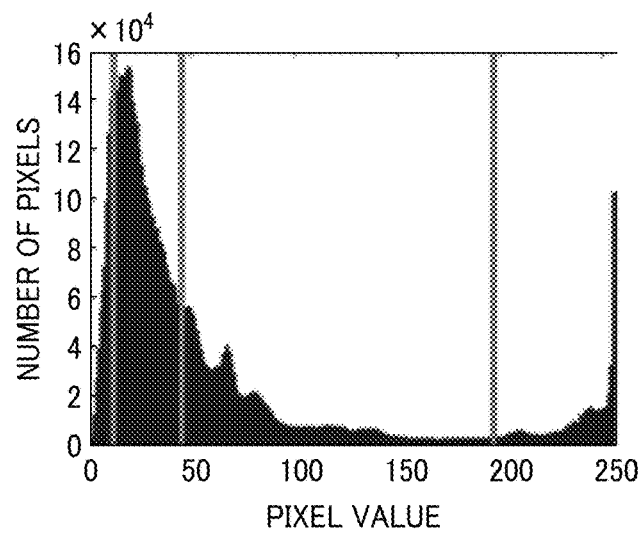
Figure 19C:
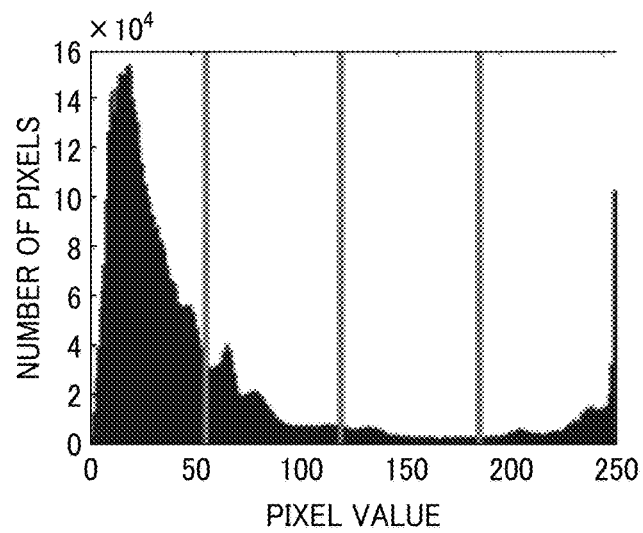

FIG. 19A, FIG. 19B, and FIG. 19C are diagrams illustrating another method of dividing the pixel values of a dimmed image, according to the present embodiment. FIG. 19A is a dimmed-image histogram with bar chart illustrating the relation between the pixel values of a dimmed image and the number of pixels of the pixels having the corresponding pixel values when the pixel values of the dimmed image ranges between 0 to 255. In the present embodiment, the area whose contrast is to be adjusted is divided into four. For this reason, an example in which the dimmed image is divided into four areas is described.

In order to divide the image into four areas, three thresholds are used. FIG. 19B illustrates a division method in which the variance is taken into consideration. In this division method, the thresholds are determined such that the variance has the largest value at the largest and smallest thresholds. FIG. 19C illustrates a simple division method as another alternative division method. In this division method, 256 levels are equally divided into four ranges, and thus the thresholds are simply at 64, 128, and 192. These methods are given as an example, and any other method may be adopted. Moreover, the number of partitions may be other than four.

Figure 20A:
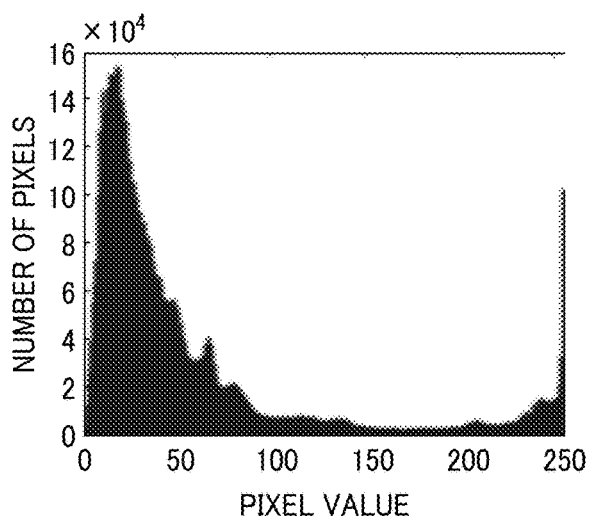
FIG. 20A, FIG. 20B, and FIG. 20C each illustrates an example of contrast adjustment according to an embodiment of the present invention.
Figure 20B:
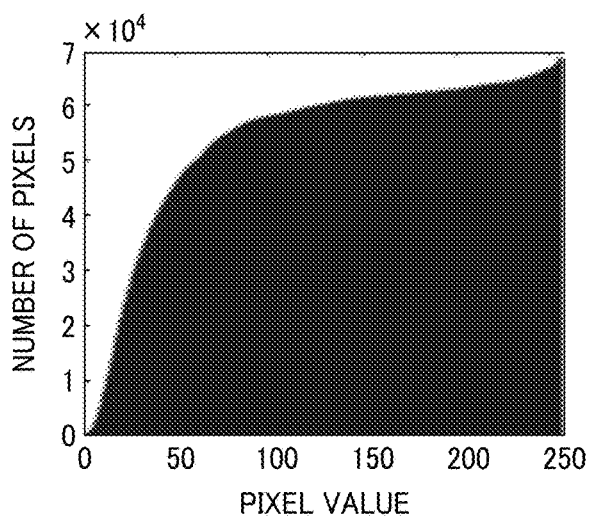
Figure 20C:
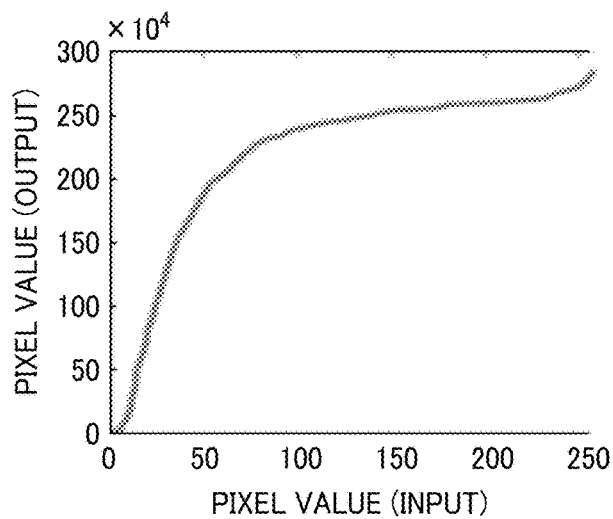

The dimmed image has been described so far in the above description. In the following description, the contrast adjustment to be performed for each of the areas obtained by dividing an original image using a dimmed image is described with reference to FIG. 20A, FIG. 20B, and FIG. 20C. FIG. 20A is an example of the histogram of an original image according to the present embodiment. FIG. 20B is an example of the cumulative histogram obtained by adding and accumulating the number of the pixels of each pixel value, according to the present embodiment. FIG. 20C is an example of the conversion curve for flattening the histogram, according to the present embodiment.

When the original image is an image having three factors such as an RGB image, the histogram is flattened for each of the three factors. The histogram may be flattened using the clipping value as described above. Firstly, a histogram as illustrated in FIG. 20A is calculated and obtained for each of the divided areas. Assuming that the pixel value is x, the histogram can be expressed as a function h(x). The number of the pixels of each pixel value is added and accumulated to obtain a cumulative histogram. Assuming that the pixel value is x, the cumulative histogram can be expressed as a function H(x). The function H(x) can be expressed in the following formula 11. Note that when x=0, H(0)=h(0) in the function H(x).

$$H(x)=H(x-1)+h(x) \qquad \text{[Formula 11]}$$

The clipping value is determined as described above, and the conversion curve is calculated and obtained using the determined clipping value. Assuming that the input and output of the conversion curve is the pixel value x and the pixel value y, respectively, and that y=L(x), the function L(x) can be expressed in the following formula 12.

$$L(x) = \frac{256 \times H(x)}{H(255)} \qquad \text{[Formula 12]}$$

Figure 21:
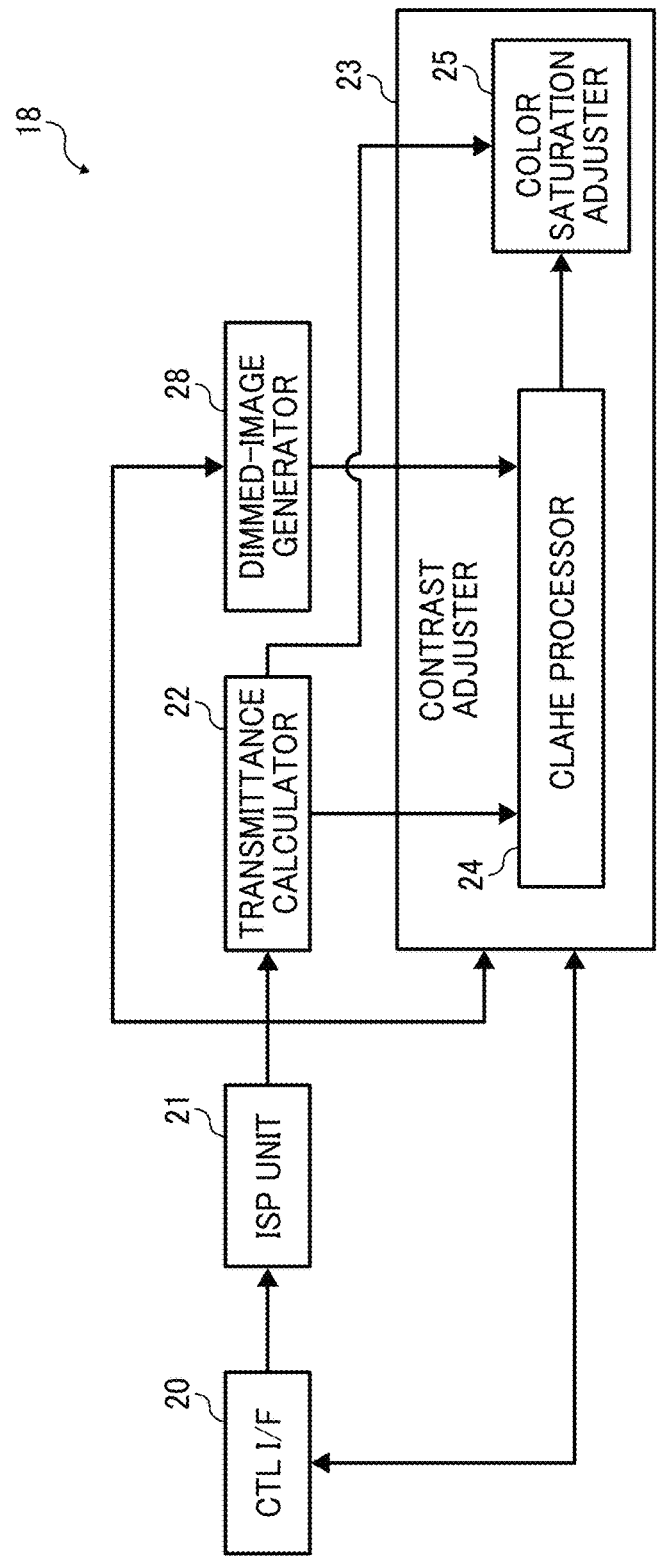
FIG. 21 is a functional block diagram illustrating further another example of an image processing system according to an embodiment of the present invention.

As illustrated in FIG. 21, the image processing circuit 18 may further be provided with a dimmed-image generator 28 that generates a dimmed image. The other aspects of the configuration are similar to the configuration illustrated in FIG. 2. In a similar manner to the sky-area detector 26 and the road-area detector 27, the dimmed-image generator 28 obtains the image data from the ISP unit 21, and generates a dimmed image from the image of the obtained image data. Alternatively, as described above, a dimmed image may be generated using the measured distance data or transmittance data. The dimmed-image generator 28 sends the data of the generated dimmed image to the contrast adjuster 23. In the contrast adjuster 23, the CLAHE processor 24 divides the received dimmed image into a plurality of areas according to the pixel values of the dimmed image, and determines the clipping value.

Figure 22:
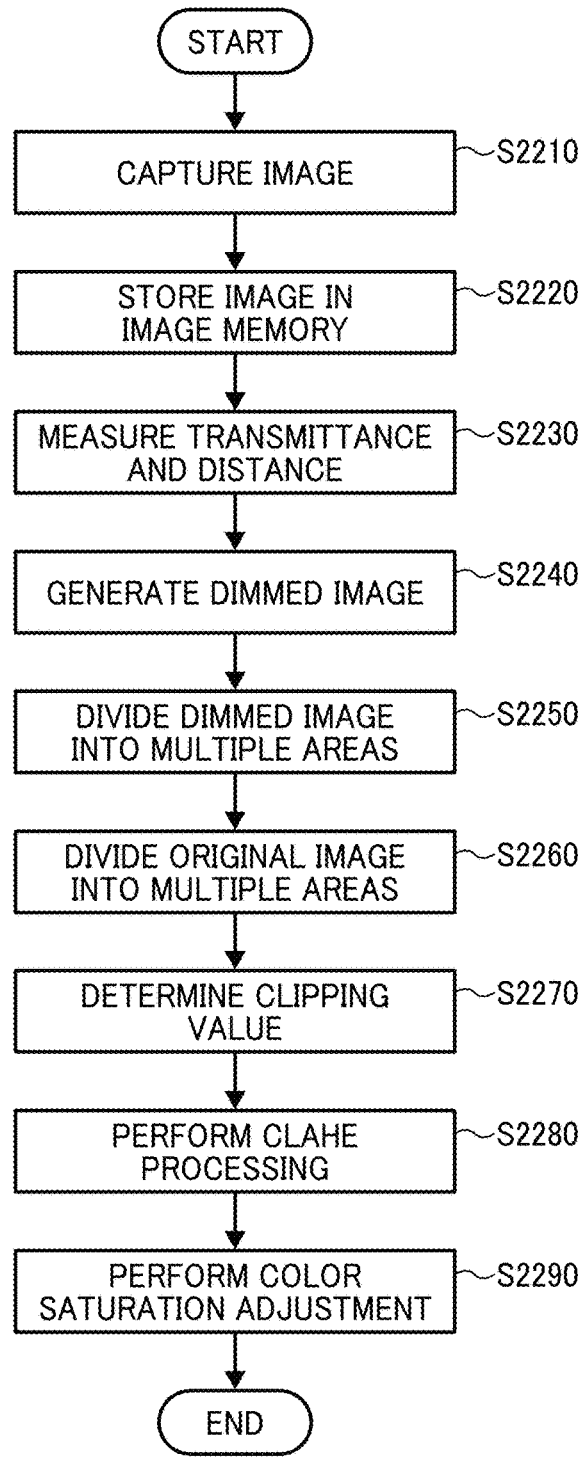
FIG. 22 is a flowchart of the flow of the contrast adjustment performed by an imaging device provided with the image processing device illustrated in FIG. 21.

FIG. 22 is a flowchart of the flow of the contrast adjustment performed by the imaging device 10 provided with the image processing device illustrated in FIG. 21. The processes of dividing an image into a plurality of areas using the above-described dimmed image and adjusting the contrast are described with reference to FIG. 22. The imaging device 10 starts the processes when the shutter button is depressed. In the step S2210, the capturing unit 12 captures an image. In the step S2220, the controller 13 stores the captured image in the image memory 14.

In the step S2230, the transmittance calculator 22 calculates and obtains the transmittance from the original image, or the transmittance measuring sensor 17 measures the transmittance. Accordingly, the transmittance data of the area between the imaging elements and the object to be captured is obtained. Moreover, the rangefinder measures the distance between the imaging device 10 and the objet to be captured, and thereby obtains the distance data. Note that the distance data may be calculated and obtained by the image processing.

In the step S2240, the dimmed-image generator 28 generates a dimmed image using the obtained transmittance data or distance data. The optical transmittance becomes smaller as the distance is longer, and the optical transmittance becomes larger as the distance is shorter. The dimmed-image generator 28 sets the pixel value to a smaller value as the transmittance is larger or the distance is shorter, and sets the pixel value to a larger value as the transmittance is smaller or the distance is longer. Accordingly, a dimmed image is generated. The dimmed-image generator 28 sends the generated dimmed image to the CLAHE processor 24.

In the step S2250, the CLAHE processor 24 divides the received dimmed image into a plurality of areas according to the pixel values of the dimmed image. Then, in the step S2260, the CLAHE processor 24 divides the original image input from the ISP unit 21 into a plurality of areas according to the divided areas of the dimmed image. The dimmed image may be divided using, for example, a dividing method where the above-described variance is considered or a dividing method where the area is equally divided. In the step S2270, the CLAHE processor 24 determines the clipping value for each of the divided areas using the method as described above.

In the step S2280, the CLAHE processor 24 uses the determined clipping value to flatten the histogram, and obtains a conversion curve. The CLAHE processor 24 may obtain a LUT instead of the conversion curve. The conversion curve or the LUT are calculated for each of the areas. Then, the CLAHE processor 24 uses the conversion curve or LUT calculated for each of the areas to adjust the contrast of each one of the areas. More specifically, the CLAHE processor 24 uses the conversion curve calculated for each of the areas to convert the pixel values of each area. The CLAHE processor 24 converts the pixel values of each area, and outputs the obtained image.

In the step S2290, the color saturation adjuster 25 adjusts the color saturation of each area of the image, and outputs the contrast-adjusted image. The contrast-adjusted image is sent to the image memory 14 through the controller 13, and is stored until the contrast-adjusted image is to be output to the output device. The process terminates, for example, when the contrast-adjusted image is sent to the image memory 14 and is stored.

As described above, the clipping value is a constraint value of the contrast, and the size of the clipping value is changed according to the transmittance of each area of the image. Accordingly, the contrast can be adjusted appropriately, and the visibility of the image improves. Moreover, by dividing the area appropriately according to the transmittance or distance instead of dividing the area into a plurality of rectangular tiles, the visibility of the image further improves.

In the embodiments described above, an area whose histogram is to be flattened is segmented according to the transmittance, the distance, or the like. Accordingly, the contrast of an image can be improved even in a thick-fog situation where it is difficult to detect a texture area. However, as the number of the partitions may be any desired number, a portion of the sky area or the like that is to be included in the same area may be divided in an undesired manner. In such cases, a boundary may be formed at a portion that is actually far from an appropriate boundary, and a false contour may appear. Moreover, as a result of the fog removal, the levels of lightness may be inverted from an image of fine weather. In such cases, the improvement in the contrast of an image is insufficient. In order to avoid such situation, a method of dividing a dimmed image, as described below, may be adopted to eliminate the occurrence of a false contour, blooming whites, or blocked up shadows. By adopting such a method of dividing a dimmed image, the contrast of an image can further be improved.

Figure 23:
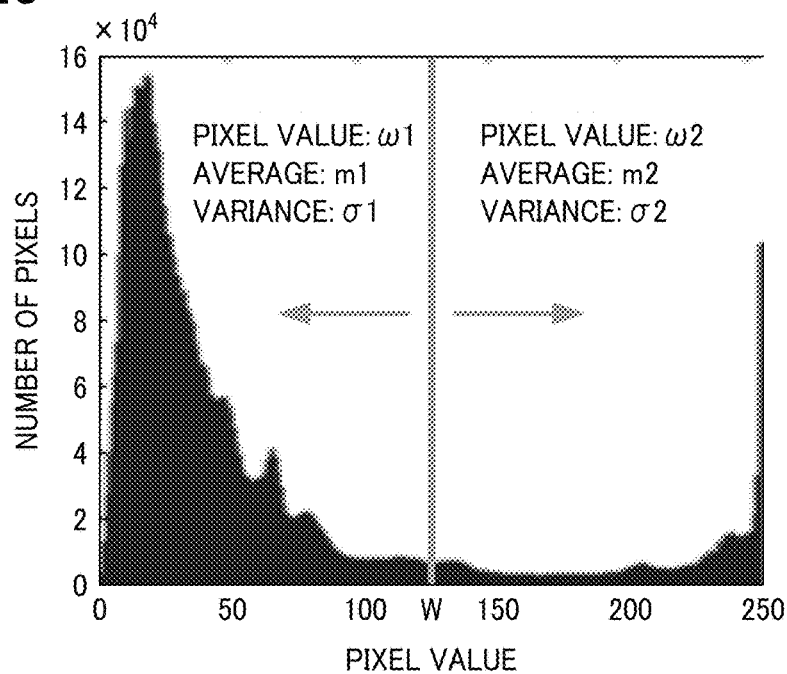
FIG. 23 is a diagram illustrating another method of dividing the pixel values of a dimmed image, according to an embodiment of the present invention.

FIG. 23 is a diagram illustrating another method of dividing the pixel values of a dimmed image, according to the present embodiment. Firstly, the division of the pixel values of a dimmed image is described with reference to FIG. 23. Assuming the histogram as illustrated in FIG. 23, the threshold is set to any desired value w, and the histogram is divided into two at the threshold w. The image is classified into a pattern region and a background region. The number of the pixels with pixel values less than the threshold is ω1, and the average and variance are m1 and σ1, respectively. The number of the pixels with pixel values equal to or greater than the threshold is ω2, and the average and variance are m2 and σ2, respectively. Accordingly, the interclass variance $\sigma_b^2$ can be expressed by the following formula 13.

$$\sigma_b^2 = \frac{\omega 1 \omega 2 (m1 - m2)^2}{(\omega 1 + \omega 2)^2} \quad \text{[Formula 13]}$$

In the present embodiment, the value of "w" is varied using the formula 13 as described above, and the threshold with which the interclass variance $\sigma_b^2$ becomes the largest is determined to be a first threshold. When the image data of an 8-bit image is used, the range of variation in "w" in the present embodiment is 0 to 255 according to the bit precision of the pixel value of the image data. When the image data of a 10-bit image is used, the range of variation in "w" is 0 to 1023. In the mode of the sky area, the threshold of 0 to sky area is used.

Note that the formula that is used to determine the threshold w is not limited to the formula 13 as described above, but may be any other formula. The number of partitions may be any number. When the number of partitions is 2, only the threshold w needs to be determined.

Figure 24:
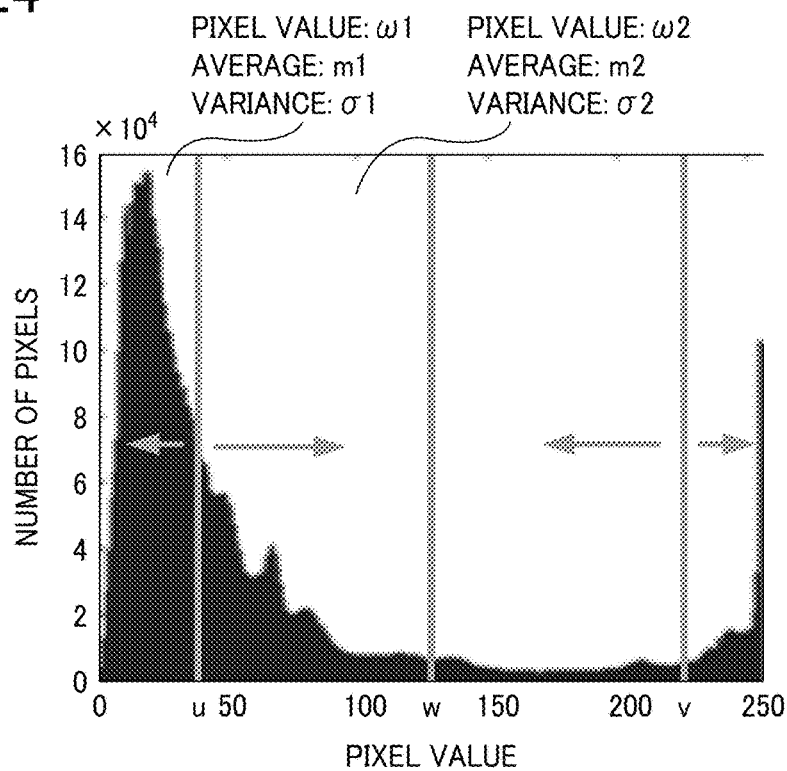
FIG. 24 is a diagram illustrating another method of dividing the pixel values of a dimmed image into two or more ranges, according to an embodiment of the present invention.

FIG. 24 is a diagram illustrating another method of dividing the pixel values of a dimmed image into two or more ranges, according to the present embodiment. Secondly, the redivision of the pixel values of a dimmed image is described with reference to FIG. 24. After the threshold w is determined using the formula 13 as described above, the pixel values of the dimmed image equal to or smaller than the threshold w can further be divided into two regions. Assuming that the threshold of such division is "u", a threshold u is calculated using the formula 13 in a similar manner to the threshold w. The threshold w is calculated using the same formula because the threshold is to be determined according to the same criteria.

If the threshold with which the interclass variance $\sigma_b^2$ becomes the largest is determined to be a second threshold u in a similar manner to the determination of the threshold w, the pixel values of the dimmed image can be divided into three regions of 0 to u, u to w, and w to 255. In a similar manner, by calculating a threshold v for the range from the threshold w to 255, the pixel values of the dimmed image can be divided into four ranges. The number of the regions is not limited to two regions, three regions, and four regions, but the pixel values of the dimmed image may be divided into fiver or more regions.

By repeating the processes as described above, the region may be divided into optimal number of regions. Although the region may be divided into any number of regions by setting a large number of thresholds, it is not desired to divide the region when the interclass variance $\sigma_b^2$ is smaller than a prescribed set value $\sigma_w$. This is because a section to be included in the same region is divided when an excessive number of thresholds are set. In such cases, a false contour is generated as described above.

When the interclass variance $\sigma_b^2$ is always equal to or smaller than the set value $\sigma_w$ regardless of the value of the threshold u in the exploration of the threshold u, no division is performed at the threshold u and the process shifts to the exploration of the next threshold v. The set value $\sigma_w$ may be selected as desired by a user, or may be determined based on the variance in the entire dimmed image. By repeating the processes as described above, the region can be divided into optimal number of regions, and the generation of a false contour can be prevented. Note that the division and redivision as described above can be implemented by the contrast adjuster 23.

Figure 25:
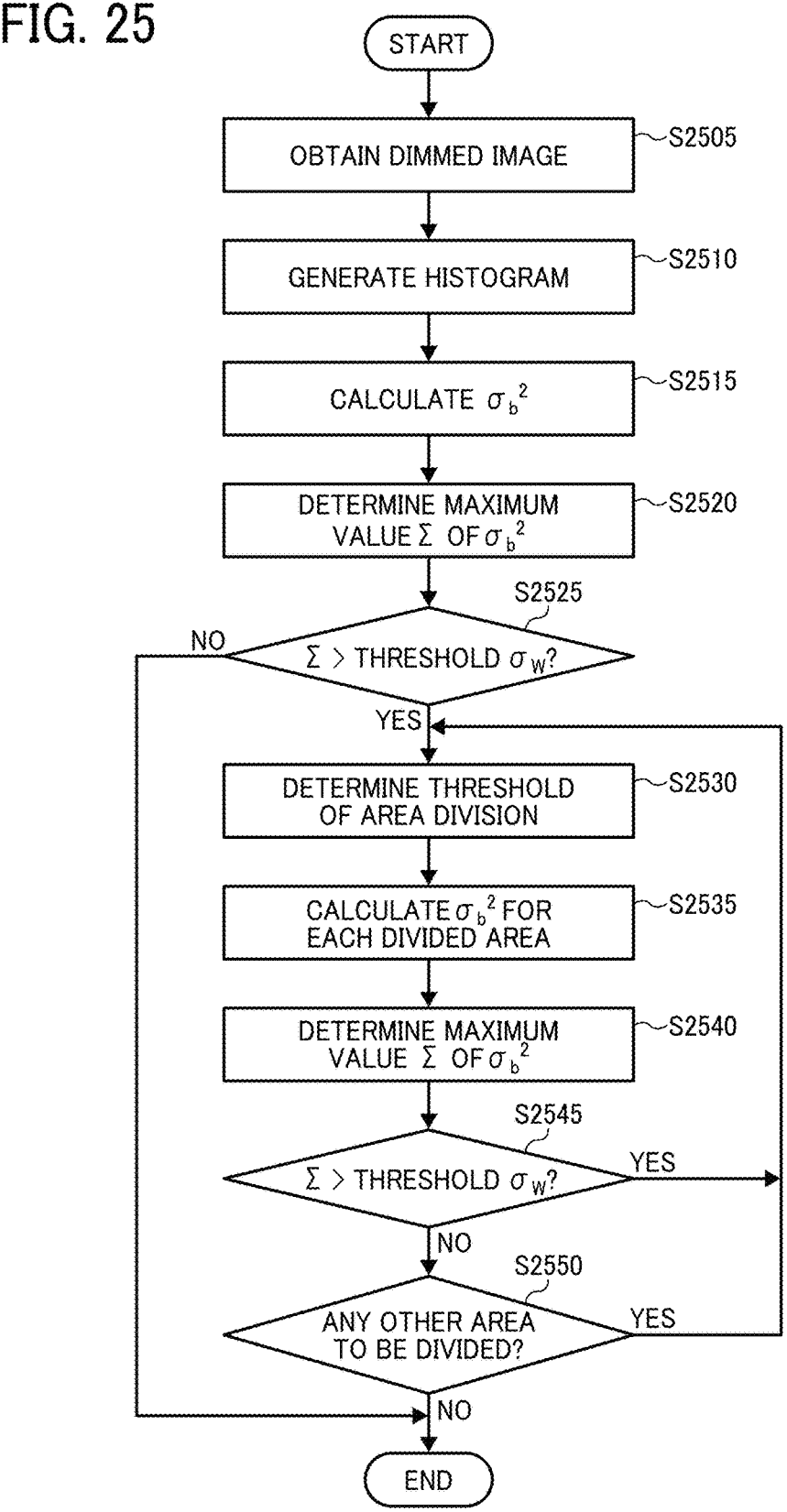
FIG. 25 is a flowchart of the processes of dividing the pixel values of a dimmed image illustrated in FIG. 24.

FIG. 25 is a flowchart of the processes of dividing the pixel values of a dimmed image illustrated in FIG. 24. The division and redivision of the pixel values of a dimmed image is described with reference to FIG. 25. In the step S2505, a dimmed image is obtained using the method described above with reference to FIG. 18. In the step S2510, a histogram of the obtained dimmed image, as illustrated in FIG. 23, is generated according to the pixel values of the dimmed image that are calculated for each of the pixels of the image data.

In the step S2515, the interclass variance $\sigma_b^2$ is calculated using the formula 13 as described above in order to divide the region of the dimmed image using the generated histogram. In the step S2520, the $\sigma_b^2$ is calculated every time the threshold w for the area division is varied to determine the maximum value Σ of $\sigma_b^2$ and the threshold w for the area division at the maximum value Σ is recorded.

In the step S2525, the maximum value Σ is compared with a prescribed threshold $\sigma_w$, and it is determined as to whether the maximum value Σ is greater than the threshold $\sigma_w$. When the maximum value Σ is equal to or smaller than the threshold $\sigma_w$, the process proceeds to the step S2555 and the process is terminated. In such cases, it is assumed that no area division is to be performed, and the contrast is adjusted as illustrated in FIG. 20. When the maximum value Σ is greater than the threshold $\sigma_w$, the process proceeds to the step S2530, and the threshold of area division w is determined to be a first threshold.

In the step S2535 and step S2540, as illustrated in FIG. 24, the threshold u is calculated for further redividing the region divided in the step S2530. The method of calculation is similar to that in the step S2515 and step S2520. In the step S2545, in a similar manner to the step S2525, the maximum value Σ is compared with a prescribed threshold $\sigma_w$, and it is determined as to whether the maximum value Σ is greater than the threshold $\sigma_w$. When the maximum value Σ is equal to or smaller than the threshold $\sigma_w$, the process proceeds to the step S2550. When the maximum value Σ is greater than the threshold $\sigma_w$, the process returns to the step S2530 to determine the threshold of area division.

In the step S2550, whether there is any other area to be divided is determined. When there is no other area to be divided, the process is terminated. When there is another area to be divided, the process returns to the step S2530 to determine the threshold of area division for the remaining region. In the present embodiment, the remaining region indicates the region with the pixel values equal to or greater than the threshold w. In the remaining region, the threshold v as described above is determined. In the step S2550, whether or not to terminate the process is determined according to whether there is any other area to be divided. However, whether or not to terminate the process may be determined according to whether the number of the divided regions is equal to or greater than a certain number.

Figure 26:
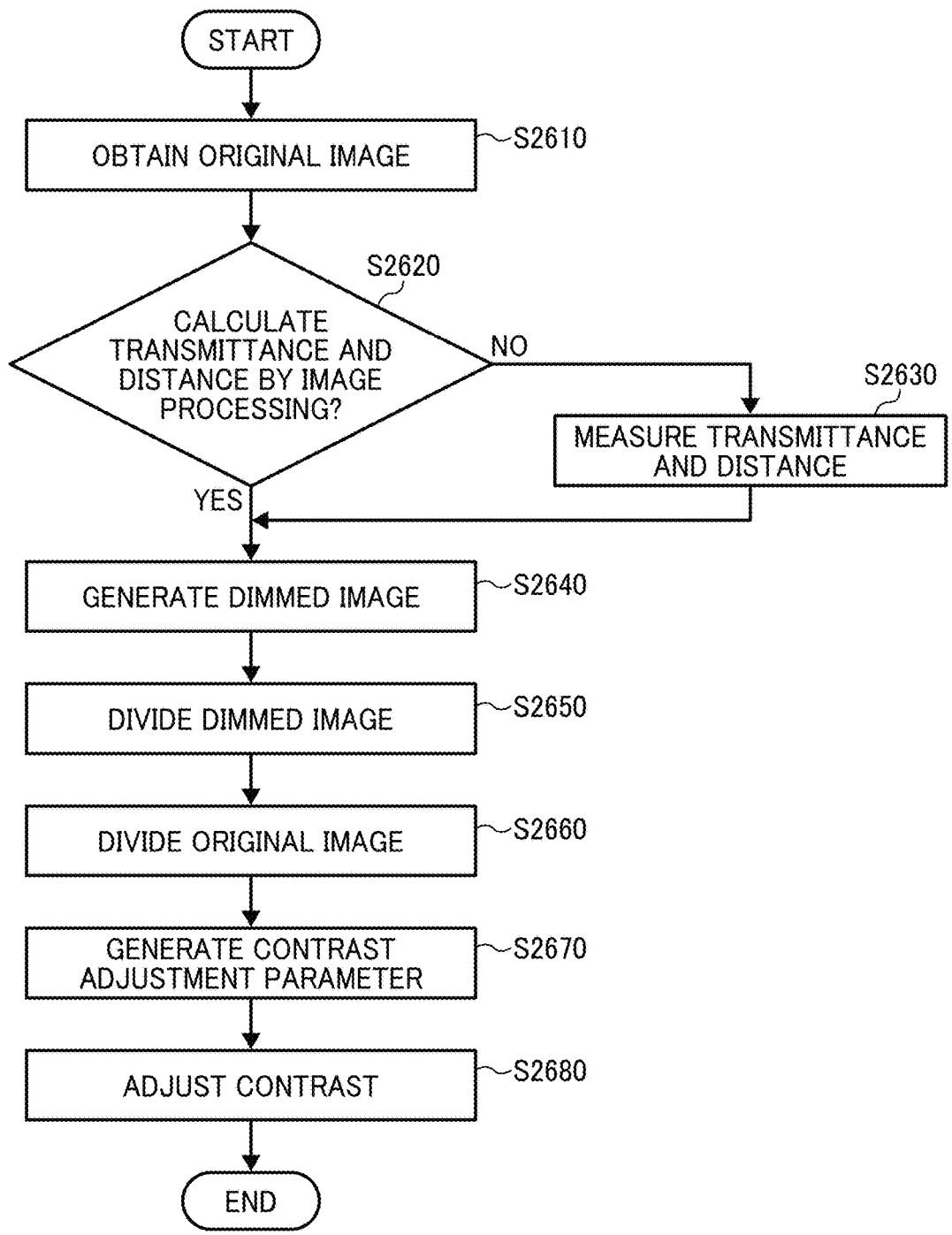
FIG. 26 is a flowchart of the flow of the contrast adjustment including the processes of dividing the pixel values of a dimmed image illustrated in FIG. 25.

In the above description, the division and redivision of the pixel values of a dimmed image has been described. The entire processes of adjusting the contrast, including the division and redivision of the pixel values of a dimmed image, are described with reference to FIG. 26. In the step S2610, the imaging device 10 obtains an original image. Note that the original image is an RGB image.

In the step S2620, whether or not to calculate the transmittance between the imaging device 10 and an objet to be captured or the distance between the imaging device 10 and the objet to be captured is determined for generating a dimmed image. When it is determined that the transmittance or the distance be calculated by performing image processing on the obtained original image, the transmittance or the distance is calculated and the process proceeds to the step S2640. When it is determined that the transmittance or the distance be calculated by a transmittance measuring unit or rangefinder, the process proceeds to the step S2630 and the transmittance or the distance is calculated.

In the step S2640, a dimmed image is generated from the transmittance and distance obtained in the step S2620 or step S2630, using the method described above with reference to FIG. 18. In the step S2650, the dimmed image is divided into multiple areas using the method described above with reference to FIG. 23 and FIG. 24. In the step S2660, the original image is divided into multiple areas using the method described above with reference to FIG. 25. In the step S2670, a contrast adjustment parameter is generated using the method described above with reference to FIG. 20.

In the step S2680, the contrast is adjusted using the contrast adjustment parameter generated for the original image in the step S2670, and the process is terminated. The contrast can be adjusted by flattening the histogram as illustrated in FIG. 20. Alternatively, the contrast may be adjusted by adjusting the contrast linearly according to the largest pixel value and the smallest pixel value in each of the areas. Moreover, the contrast may be adjusted by adopting, for example, a gamma correction in which the levels of gradation of an image is adjusted according to the curve of a desired gamma value such that the gamma indicating the response characteristic of the gradation of the image will be 1.

In the above description, cases have been described in which an image whose contrast is to be adjusted is an image captured by the imaging device 10. However, the image whose contrast is to be adjusted is not limited to an image captured by the imaging device 10. In other words, the image whose contrast is to be adjusted may be, for example, an image received from the server through the network, and an image stored in a recording medium such as a compact disc read only memory (CD-ROM) and an SD card.

The image processing device and the image processing system are not limited to the configurations illustrated in FIG. 2, FIG. 11, FIG. 14, and FIG. 21, and may include two of the sky-area detector 26, the road-area detector 27, and the dimmed-image generator 28. Alternatively, the image processing device or the image processing system may include all of the sky-area detector 26, the road-area detector 27, and the dimmed-image generator 28.

In the above description, the embodiments of the present invention have been described as the image processing device, the image processing system, the imaging device, the image processing method, and the program. However, no limitation is intended thereby. The embodiments of the present invention have been described above, but the present invention is not limited to those embodiments and various applications and modifications may be made without departing from the scope of the invention. The embodiments of the present invention may include, for example, a recording medium storing the program as described above, or a server that provides the program through the network.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, read only memory (ROM), etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An image processing system comprising:
a divider configured to divide an image into a plurality of areas according to a predetermined division condition;
a measuring unit configured to measure an optical transmittance of each of the plurality of areas of the image or data correlating with the optical transmittance as transmittance data, or calculate the optical transmittance or the data correlating with the optical transmittance as the transmittance data;
a determination unit configured to determine a parameter for adjusting a contrast for each of the plurality of areas according to the transmittance data measured or calculated by the measuring unit; and
an adjuster configured to adjust a contrast of each one of the plurality of areas using the parameter determined by the determination unit.

2. The image processing system according to claim 1, wherein the measuring unit calculates the transmittance data using a smallest pixel value of pixels forming a local area of the image.

3. The image processing system according to claim 1, wherein
the image is an image captured by an imaging device including a lens configured to magnify and capture an object to be captured,
the image processing system further includes a lens data acquisition unit configured to obtain lens data of the lens, and
the determination unit determines the parameter according to the lens data and the transmittance data.

4. The image processing system according to claim 1, further comprising:
a sky-area detector configured to detect a sky area of the image,
wherein the adjuster adjusts a contrast of the sky area using a predetermined parameter.

5. The image processing system according to claim 1, further comprising:
a road-area detector configured to detect a road area of the image,
wherein the adjuster adjusts a contrast of the road area using a predetermined parameter.

6. The image processing system according to claim 1, further comprising:
a dimmed-image generator configured to generate a dimmed image using one of an optical transmittance calculated from the image, an optical transmittance measured by the measuring unit, a transmittance calculated from a reflectance of an emitted laser beam, distance between an imaging device to an object to be captured measured by a rangefinder, and distance between a plurality of imaging devices and the object to be captured calculated from parallaxes of a plurality of images captured by the imaging devices,
wherein the divider divides the image into the plurality of areas according to a pixel value of the dimmed image as the predetermined division condition.

7. The image processing system according to claim 6, wherein the dimmed-image generator replaces a pixel value of a pixel selected from a plurality of pixels of the image and pixel values of peripheral pixels excluding the selected pixel within a prescribed area including the selected pixel with a smallest pixel value of the peripheral pixels, to generate the dimmed image.

8. The image processing system according to claim 6, wherein the divider determines a specified pixel value of the dimmed image to be a threshold as the predetermined division condition, and divides the image into the plurality of areas according to the determined threshold.

9. The image processing system according to claim 8, wherein the divider divides the pixel values of the dimmed image into two areas according to the pixel values of the dimmed image, calculates a variance between the two areas, and determines a pixel value of the variance with a largest value to be the threshold.

10. The image processing system according to claim 9, wherein the divider determines the pixel value of the variance with the largest value to be the threshold when the pixel value of the variance with the largest value is greater than a prescribed value.

11. The image processing system according to claim 10, wherein the divider further divides the divided pixel values of the dimmed image into two areas according to the divided pixel values of the dimmed image, calculates a variance between the two areas, and determines two or more thresholds when the pixel value of the variance with the largest value is greater than a prescribed value.

12. An imaging device comprising an capturing unit configured to capture an image; and
the image processing system according to claim 1.

13. An image processing device comprising one or more processors configured as:
a divider configured to divide an image into a plurality of areas according to a predetermined division condition;
a measuring unit configured to measure an optical transmittance of each of the plurality of areas or data correlating with the optical transmittance as transmittance data, or calculate the optical transmittance or the data correlating with the optical transmittance from the image as the transmittance data;
a determination unit configured to determine a parameter for adjusting a contrast for each of the plurality of areas according to the transmittance data measured or calculated by the measuring unit; and
an adjuster configured to adjust a contrast of each one of the plurality of areas using the parameter determined by the determination unit.

14. A method of processing an image, the method comprising:
dividing an image into a plurality of areas according to a predetermined division condition;
measuring an optical transmittance of each of the plurality of divided areas or data correlating with the optical transmittance as transmittance data;
calculating the optical transmittance or the data correlating with the optical transmittance from the image as the transmittance data;
determining a parameter for adjusting a contrast for each of the plurality of areas according to the transmittance data obtained by the measuring or the calculating; and
adjusting a contrast of each one of the plurality of areas using the parameter determined by the determining.

15. A computer-readable non-transitory recording medium storing a program for causing a computer to execute the method according to claim 14.

* * * * *